United States Patent
Lövsén

(10) Patent No.: US 11,991,609 B2
(45) Date of Patent: *May 21, 2024

(54) METHOD AND NODES FOR HANDLING CONNECTIVITY TO A DATA NETWORK

(71) Applicant: Telefonaktiebolaget LM Ericsson (publ), Stockholm (SE)

(72) Inventor: Lars Lövsén, Gothenburg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/972,709

(22) Filed: Oct. 25, 2022

(65) Prior Publication Data

US 2023/0052569 A1 Feb. 16, 2023

Related U.S. Application Data

(63) Continuation of application No. 16/755,986, filed as application No. PCT/EP2017/076356 on Oct. 16, 2017, now Pat. No. 11,516,641.

(51) Int. Cl.
| | | |
|---|---|---|
| *H04W 4/60* | (2018.01) | |
| *H04W 8/20* | (2009.01) | |
| *H04W 76/11* | (2018.01) | |
| *H04W 80/10* | (2009.01) | |

(52) U.S. Cl.
CPC .......... *H04W 4/60* (2018.02); *H04W 8/205* (2013.01); *H04W 76/11* (2018.02); *H04W 80/10* (2013.01)

(58) Field of Classification Search
CPC ....... H04W 4/60; H04W 8/205; H04W 76/11; H04W 80/10; H04W 76/12; H04W 8/00
See application file for complete search history.

(56) References Cited

U.S. PATENT DOCUMENTS

| | | | |
|---|---|---|---|
| 8,477,606 B2 | 7/2013 | Chen et al. | |
| 10,517,013 B2 | 12/2019 | Jeong et al. | |
| 11,516,641 B2* | 11/2022 | Lövsén | ............... H04W 80/10 |
| 2013/0095826 A1 | 4/2013 | Vrbaski et al. | |
| 2013/0291075 A1 | 10/2013 | Sirotkin et al. | |
| 2015/0350870 A1 | 12/2015 | Horn et al. | |

(Continued)

FOREIGN PATENT DOCUMENTS

| | | |
|---|---|---|
| CN | 106416340 A | 2/2017 |
| CN | 107018542 A | 8/2017 |

(Continued)

OTHER PUBLICATIONS

Office Action (including English summary) for Chinese Patent Application No. 201780095908.7 dated Dec. 27, 2022.

(Continued)

*Primary Examiner* — Brandon J Miller
(74) *Attorney, Agent, or Firm* — Sage Patent Group

(57) ABSTRACT

A method performed by a Radio Access Management Function (RAMF) for handling connectivity to a data network is disclosed. The RAMF receives, from a UE, a request associated with connectivity to the data network for an application having a subscription ID. The RAMF selects, based on at least a part of the subscription ID, which Session Management Function the request should be forwarded to, and forwards the request to the selected Session Management Function.

20 Claims, 15 Drawing Sheets

(56) References Cited

U.S. PATENT DOCUMENTS

| | | |
|---|---|---|
| 2016/0338027 A1 | 11/2016 | Sun |
| 2017/0303259 A1 | 10/2017 | Lee et al. |
| 2018/0199303 A1 | 7/2018 | Vayilapelli et al. |
| 2018/0199398 A1* | 7/2018 | Dao .................. H04L 41/5041 |
| 2018/0336557 A1* | 11/2018 | Khurana ............. G06Q 20/405 |
| 2019/0037636 A1 | 1/2019 | Kim et al. |
| 2019/0069199 A1* | 2/2019 | Yan .................. H04W 28/0268 |
| 2019/0150219 A1 | 5/2019 | Wang et al. |
| 2020/0187277 A1 | 6/2020 | Lee et al. |

FOREIGN PATENT DOCUMENTS

| | | |
|---|---|---|
| CN | 106105281 B | 3/2020 |
| RU | 2461997 C2 | 9/2012 |
| WO | WO 2017/142362 A1 | 8/2017 |

OTHER PUBLICATIONS

International Search Report and Written Opinion of the International Searching Authority, PCT/EP2017/076356, dated Jun. 16, 2018, 13 pages.
Huawei et al., "TS23.502 NF services supported by AMF-Discussion," 3GPP Tsgsa WG2 Meeting #120, S2-172232, Busan, Korea, Mar. 27-31, 2017, 7 pages.
Huawei et al., "TS23.502 NF services supported by AMF-system procedures," 3GPP TSGSA WG2 Meeting #120, S2-172234, Busan, Korea, Mar. 27-31, 2017, 22 pages.
3GPP TS 23.501 V0.3.1 (Mar. 2017), 3rd Generation Partnership Project; Technical Specification Group Services and System Aspects; System Architecture for the 5G System; Stage 2 (Release 15), 97 pages.
Russian Office Action dated Aug. 7, 2020 for Russian Patent Application No. 2020115716/07, 14 pages (including English translation).
First Examination Report, Indian Patent Application No. 202047015776, dated Nov. 10, 2021, 6 pages.

* cited by examiner

METHOD AND NODES FOR HANDLING CONNECTIVITY TO A DATA NETWORK

CROSS REFERENCE TO RELATED APPLICATIONS

This application is a continuation of U.S. patent application Ser. No. 16/755,986, filed Apr. 14, 2020, which itself is a 35 U.S.C. § 371 national stage application of PCT International Application No. PCT/EP2017/076356 filed on Oct. 16, 2017, the disclosure and content of which is incorporated by reference herein in its entirety.

TECHNICAL FIELD

Embodiments herein relate generally to a Radio Access Management Function (RAMF), a method performed by the RAMF, a Session Management Function (SMF), a method performed by the SMF, a User Equipment (UE) and a method performed by the UE. More particularly the embodiments herein relate to handling connectivity to a Data Network, (DN).

BACKGROUND

In the present development of mobile systems and in particular for the Fifth Generation (5G), the network is partitioned in a (Radio) Access Network ((R)AN) and a Core Network (CN) which is further divided in one part handling mobility (the whereabouts of devices, UEs) and another part handling the connectivity (sessions) for UEs to data networks.

For the purpose of gaining connectivity the same identity (the identity may be e.g. an International Mobile Subscriber Identity (IMSI)) is used for authentication and/or authorization for both mobility and connectivity, while there is readily a possibility to have a second authentication for session connectivity. The data network serving the connection handles the second authentication, so it cannot be used within the CN/connectivity handling for any other purpose than conforming that the user is allowed to access the data network.

The 5G point-to-point and service based architecture for the roaming case is depicted in FIG. 1 and FIG. 2 (ref. 3GPP TS 23.501 v1.4.0). FIG. 1 illustrates a non-roaming 5G System architecture with a home routed scenario using a reference point representation. FIG. 2 illustrates a roaming 5G System architecture with a home routed scenario using a reference point representation.

FIG. 1 illustrates a UE 101 connected to a (Radio) Access Network ((R)AN) 103. The (R)AN 103 is connected to an Access and Mobility Management Function (AMF) 105 via a N2 reference point. The UE 101 is connected to the AMF 105 via a N1 reference point. The AMF 105 is adapted to be connected to an SMF 108 via a N11 reference point. The SMF 108 is adapted to be connected to two User plane Functions (UPF) 125 via a respective N4 reference point. The (R)AN 103 is adapted to be connected one of the UPFs 125 via a N3 reference point. The two UPFs 125 are adapted to be connected to each other via a N9 reference point. Each UPFs 125 is adapted to be connected to a respective DN 120 via respective N6 reference point. The DN may be e.g. operator services, Internet access or 3rd party services. The AMF 105 is adapted to be connected to an Authentication Server Function (AUSF) 128 via a N12 reference point. The AMF 105 is adapted to be connected to a Unified Data Management (UDM) 130 via a N8 reference point. The AUSF 128 is adapted to be connected to the UDM 130 via the N13 reference point. The SMF 108 is adapted to be connected to the UDM 130 via a N10 reference point. The SMF 108 is adapted to be connected to a Policy Control function (PCF) 133 via a N7 reference point. The PCF 133 is adapted to be connected to an Application Function (AF) 135 via a N5 reference point. The PCF 133 is adapted to be connected to the AMF 105 via a N15 reference point. A reference point may also be referred to as an interface.

FIG. 2 illustrates a Visited Public Land Mobile Network (VPLMN) 200 and a Home Public Land Mobile Network (HPLMN) 210. The dotted vertical line illustrate the division between the VPLMN 200 and the HPLMN 210, where the VPLMN 200 is on the left side of the dotted vertical line and the HPLMN 210 is on the right side of the dotted vertical line. FIG. 2 illustrates the UE 101 adapted to be connected to the (R)AN 103. The (R)AN 103 is adapted to be connected to one UPF 125 via the N3 reference point. The UE 101 is adapted to be connected to the AMF 105 via the N1 reference point. The (R)AN 103 is adapted to be connected to the AMF 105 via the N2 reference point. The AMF 105 is adapted to be connected to the NSSF 106 via the N22 reference point. Two UPFs 125 are adapted to be connected to each other via the N9 reference point, where one UPF 125 is in the VPLMN 200 and the other UPF 125 is in the HPLMN 210. Each UPF 125 is adapted to be connected to a respective SMF 108 via a respective N4 reference point. Thus, there are two SMFs 108, where one SMF 108 is in the VPLMN 200 and therefore illustrated as a V-SMF and the other SMF 108 is in the HPLMN 210 and therefore illustrated as a H-SMF. The V-SMF and the H-SMF 108 are adapted to be connected to each other via a N16 reference point. The V-SMF 108 is adapted to be connected to the AMF 105 via the N11 reference point. The UPF 125 in the HPLMN 210 is adapted to be connected to a DN 120 via a N6 reference point. A PCF 133 is located in the VPLMN 200 and is therefore illustrated as a vPCF and another PCF 133 is located in the HPLMN 210 and is therefore illustrated as an H-PCF. The PCF 133 in the VPLMN 200 is adapted to be connected to the AMF 105 via a N15 reference point. The H-PCF 133 in the HPLMN 210 is adapted to be connected to the vPCF 133 in the VPLMN 200 via the N24 reference point. The H-SMF 108 in the HPLMN 210 is adapted to be connected to the H-PCF 133 via the N7 reference point. A UDM 130 is located in the HPLMN 210 and is adapted to be connected to the AMF 105 in the VPLMN 200 via the N8 reference point and to the SMF 108 in the HPLMN 210 via a N10 reference point. An AUSF 128 is located in the HPLMN 210 and is adapted to be connected to the UDM 130 via the N13 reference point and to the AMF 105 in the VPLMN 200 via the N12 reference point The H-PCF 133 in the HPLMN 210 is adapted to be connected to the AF 135 via the N5 reference point.

The VPLMN 200 comprises at least some of the following entities: UE 101, (R)AN 130, UPF 125, AMF 105, V-SMF 108, NSSF 106 and vPCF 133. The HPLMN 210 comprises at least some of the following entities: UPF 125, DN 120, H-SMF 108, AUSF 128, H-PCF 133, AF 135 and UDM 13.

The UDM 130 in the HPLMN 210 hosts the UE 101 authentication and basic authorization data. The N8 reference point (between the AMF 105 and the UDM 130) provides the authentication/authorization for the radio access and mobility part, whereas the N10 reference point (between the UDM 130 and the SMF 108) provides the necessary authentication/authorization for sessions towards a DN 120. The 3GPP TS 23.501 v1.4.0 has the following statements about how slices can be formed:

The network (e.g. a PLMN) can also be divided in so called slices. A single UE 101 can simultaneously be served by one or more Network Slice instances via a 5G-AN. The AMF 105 instance serving the UE 101 logically belongs to each of the Network Slice instances serving the UE 101, i.e. this AMF 105 instance is common to the Network Slice instances serving a UE 101.

A Protocol Data Unit (PDU) session belongs to one and only one specific Network Slice instance per PLMN. Different Network Slice instances do not share a PDU session, though different slices may have slice-specific PDU sessions using the same Data Network Name (DNN). A PDU session may be described as an association between the UE 101 and the DN 120.

From this, it is seen that the architecture supports a strict separation of the responsibilities for radio access and mobility (at the AMF 105) and the handling of the connectivity (at the SMF 108). Notably the Third Generation Partnership Project (3GPP) has defined separate reference points for acquiring subscription data for the RAN access/mobility (AMF 105 uses N8) and the subscription data for connectivity (SMF 108 uses N10). Still, the 3GPP work progresses under the assumption that the same identity is used for both the RAN access/mobility and the connectivity.

A 5G solution to direct the access connectivity to the appropriate anchor involves three steps performed by the RAN 103:

Step 1) The selection function is based on if the device supports 5GC or not (indicated by the UE 101 at attach over Long Term Evolution (LTE) Radio Resource Control (RRC)). A selection is performed by the eNB among the Evolved Packet core (EPC) and Next Generation Core (5GC). The 5G gNB in the RAN 103 does not perform any selection, it uses only 5GC.

Step 2) A slice selection using Non Access Stratum (NAS) Node Selection Function (NNSF), using either Dedicated Core Network (DECOR), or evolved DECOR (eDECOR), or Multi-Operator Core Network (MOCN), or similar, pending 3GPP 5G Core rel15+ standards Step 3) Selection of instance within a pool inside each slice, for load balancing across pool members.

Considered from a device perspective, there are practical cases where many small devices would get a poor cost/benefit ratio:

a) from being required to have its own UE 101 (device manufacturing and power consumption), b) by the legacy requirement that the device need a Subscriber Identity Module (SIM) with an operator controlled IMSI (the device owner need to rely on the operator to manage the devices), interface c) from the need to decouple its own mobility from the UE 101 (assuming the device is decoupled from the UE 101, it is a limitation to tie the device to one specific UE 101).

The term "device" or "small device" used above refers to a device which is located behind a UE 101. Such device has typically no own connection to the DN 120, but connects via the UE 101 connection. An example of a device is a GPS device, a sport watch, a camera etc.

Lacking in the present architecture is:

The organization owning/maintaining the small devices to add/remove/block/upgrade the devices in a cost-effective manner.

A possibility to enable the management of the small devices to be independent from a particular operator's domain.

To allow the small device to establish its specialized connectivity, independent from the UE 101 per se.

Therefore, there is a need to at least mitigate or solve these issues.

SUMMARY

An objective of embodiments herein is therefore to obviate at least one of the above disadvantages and to improve handling of connectivity to a DN.

According to a first aspect, the object is achieved by a method performed by a Radio Access Management Function (RAMF) for handling connectivity to a DN. The RAMF receives, from a UE, a request associated with connectivity to the DN for an application having a subscription ID. The RAMF selects, based on at least a part of the subscription ID, which SMF the request should be forwarded to, and forwards the request to the selected SMF.

According to a second aspect, the object is achieved by a method performed by a SMF for handling connectivity to a DN. The SMF receives, from a RAMF, a request associated with connectivity to the DN for an application having a subscription ID. The SMF determines that the request is accepted, and transmits, to the RAM F, accept information indicating the accept of the request, a temporary ID, a SMF ID and a connection ID.

According to a third aspect, the object is achieved by a RAMF for handling connectivity to a Data Network. The RAMF is adapted to receive, from a UE, a request associated with connectivity to the DN for an application having a subscription ID. The RAMF is adapted to select, based on at least a part of the subscription ID, which SMF the request should be forwarded to, and to forward the request to the selected SMF.

According to a fourth aspect, the object is achieved by a SMF for handling connectivity to a DN. The SMF is adapted to receive, from a RAMF, a request associated with connectivity to the DN for an application having a subscription ID. The SMF is adapted to determine that the request is accepted, and to transmit, to the RAMF, accept information indicating accept of the request, the temporary ID, a SMF ID and a connection ID.

Thanks to the subscription ID which is a dedicated user ID for connectivity, the subscription ID can be used for other purposes in addition to confirming that the application is granted access to the DN, and thus, the handling of connectivity to a DN is improved.

Embodiments herein afford many advantages, of which a non-exhaustive list of examples follows:

With a separation of identities for RAN access/mobility versus identities for connectivity the mobility and connectivity aspects can be separated enabling an array of possibilities.

An advantage of the embodiments herein is that one UE may serve multiple applications/secondary devices without any tight integration.

Another advantage of the embodiments herein is that an application/secondary device access can be tailored independent from the UE details.

A further advantage of the embodiments herein is that the management of applications/secondary devices can be closely associated with the organization that manages the applications/secondary devices.

Additionally, the application/secondary device can potentially be used together with any UE that supports the local communication with the application/secondary device.

An advantage of the embodiments herein is that the operation and management of the RAN access domain and the core network domain are independent.

The embodiments herein provide advantages for the application/secondary device, such as the UE may conduct a local authorization for applications/devices to allow/deny the use of connectivity.

The communication between the secondary device and the UE can be based on any technology.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 5b is a continuation of FIG. 5a.

The drawings are not necessarily to scale and the dimensions of certain features may have been exaggerated for the sake of clarity. Emphasis is instead placed upon illustrating the principle of the embodiments herein.

DETAILED DESCRIPTION

Figure 3:
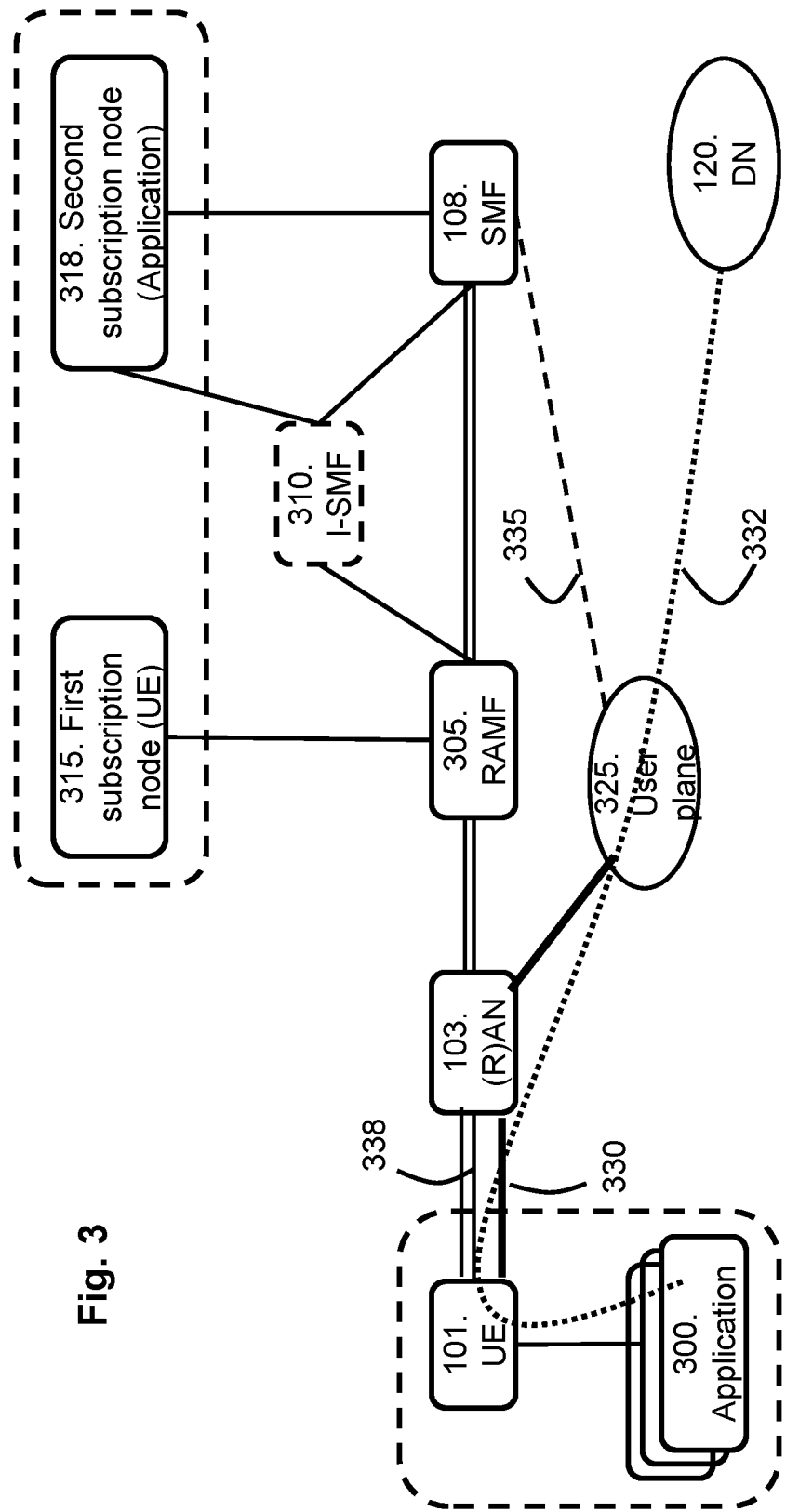
FIG. 3 is a schematic block diagram illustrating an embodiment of a communication system.

FIG. 3 is a schematic block diagram illustrating an embodiment of a communication system architecture which embodiments herein may be implemented. The communications system may in some embodiments be based on 5G or any other suitable 3GPP or non-3GPP technology where the control signaling for mobility and session (connectivity) is separated.

The UE 101 is adapted to communicate with at least one application 300. There may be one, two or more applications 300, i.e. there may be one or a plurality of applications 300. An application 300 may be co-located or incorporated into the UE 101, or the application 300 may be located in a separate device. In case the application 300 is located in a device which is separated from the UE 101, such device may be referred to as a secondary device or a small device. The application 300 is located behind the UE 101, as seen from the network side. The application 300 has typically no direct connection to the DN 120, but has such connection via the UE 101. An example of a secondary device is a GPS device, a sport watch, a camera etc.

The UE 101 may be described as serving one or multiple applications or secondary devices. The dotted around the UE 101 and the application 300 in FIG. 3 illustrates that they may be co-located.

The UE 101 may be a device by which a subscriber may access services offered by an operator's network and services outside operator's network to which the operators radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another device or a server.

The UE 101 is adapted to communicate with a (R)AN 103. The (R)AN may comprise a RAN node (not shown in FIG. 3) such as a base station, a NodeB, an eNodeB, gNB or any other network unit capable to communicate over a radio carrier with the UE 101. The abbreviations (R)AN and RAN may be used interchangeably herein when referring to an access network, a radio access network, a node comprised in the access network and a node comprised in the radio access network.

Figure 1:
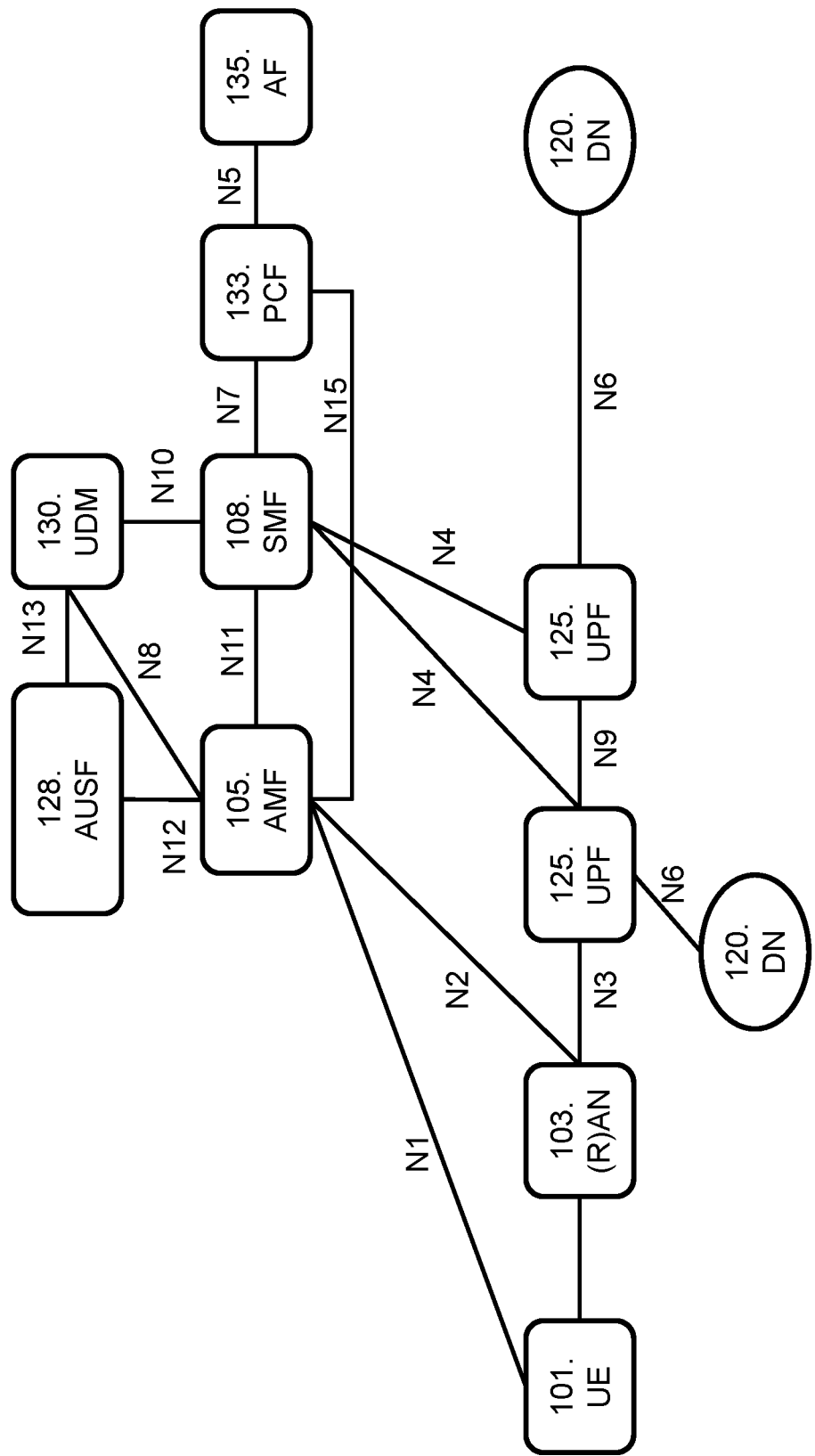
FIG. 1 is a schematic block diagram illustrating an embodiment of a non-roaming 5G architecture using a reference point representation.
Figure 2:
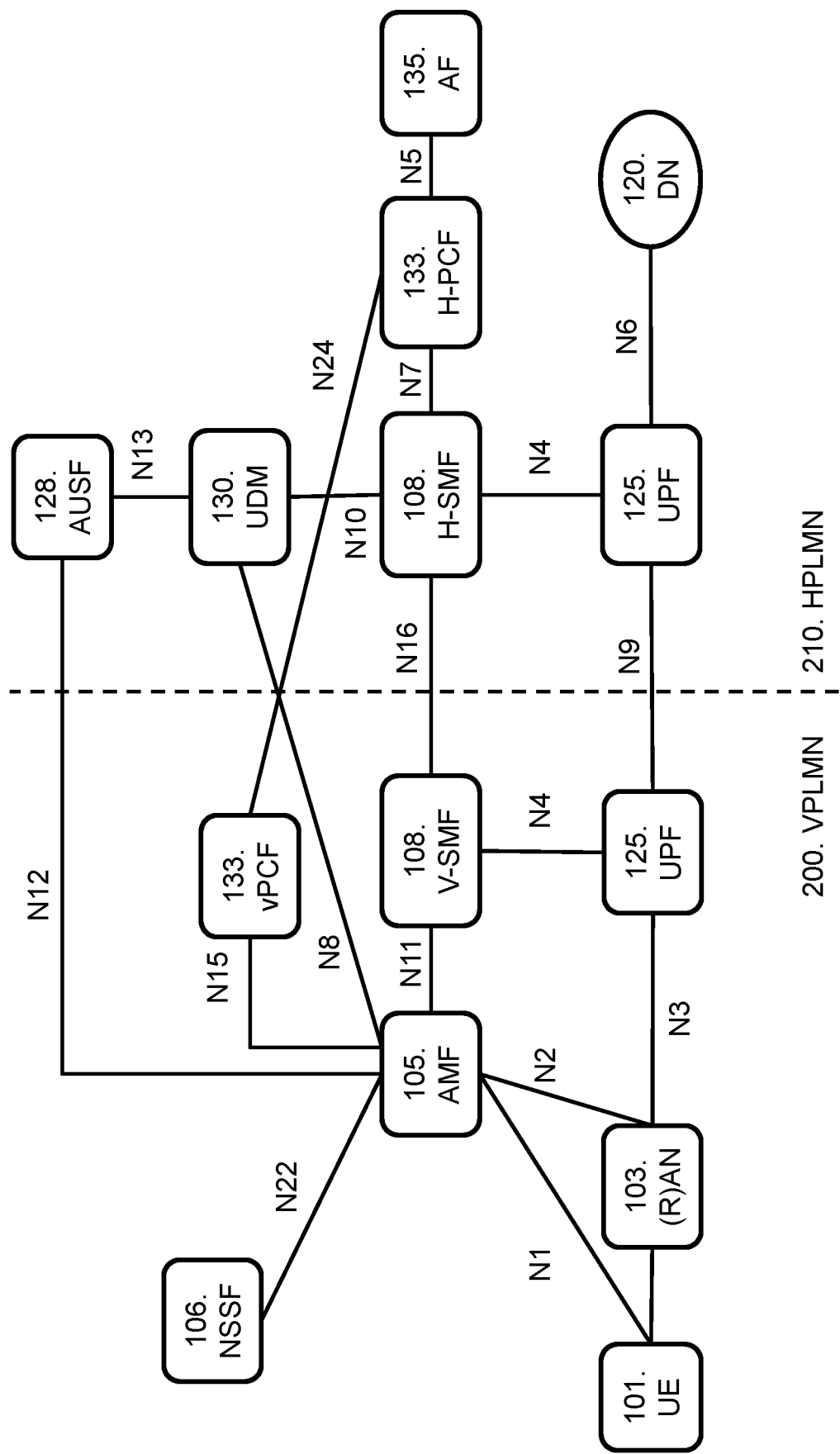
FIG. 2 is a schematic block diagram illustrating an embodiment of a 5G architecture using a reference point representation at roaming with a home-routed access.

The RAN 103 is adapted to communicate with a RAMF 305. The RAMF 305 may be an AMF 105 as illustrated in FIGS. 1 and 2.

The RAMF 305 is adapted to communicate with at least one SMF 108. FIG. 3 illustrates one SMF 108 for the sake of simplicity, but there may be two or more SMFs in other examples.

An Interrogating-SMF (I-SMF) 310 may be adapted to communicate with the RAMF 305 and the SMF 108. The I-SMF 310 may be seen as being located between the RAMF 305 and the SMF 108. In some of the figures and in this description, reference numbers 108 and 310 are used together. This refers to that the SMF can be any one of a SMF or an I-SMF, and this can also be referred to with the term (I-)SMF. The I-SMF 310 is drawn with a dotted line in order to indicate that it is an optional entity in the communication system. One task of the I-SMF 310 is to direct a request to an/the appropriate SMF 108 when the RAMF 305 itself does not have sufficient information to address the correct SMF. An example of a scenario where such task is performed is "join" via an additional RAMF (e.g. serving another UE 101 that the application 300 choses to use for the application's connectivity) where the subscriber ID does not resolve at the RAMF to the actual SMF in use. In this text, the SMF 108, 310 may also be referred to as a domain.

For the "join" method (see e.g. FIG. 7 described below) the <user> part of the subscription ID may have an encoding so that the RAMF 305 addresses the correct SMF 108, 310 in the first attempt. Either of these factors may require an I-SMF 310:

The temporary ID does not resolve to the actual SMF 108, 310.

The permanent user ID is used in the request.

The RAMF 305 lacks from the information to resolve the SMF address (the application provided information enough but the network support is not sufficient for resolving).

The RAMF 305 may be adapted to communicate with a first subscription node 315 and may be associated with the UE 101 in that it comprises UE subscription information. The SMF 108 may be adapted to communicate with a second subscription node 318 which may be associated with the application 300 in that it comprises application subscription information. The first and second subscription nodes 315, 318 may be separate nodes or they may be collocated (the co-location is illustrated with the dotted line). The first and second subscription nodes 315, 318 may also be referred to as subscription databases. The information comprised in the first and second subscription nodes 315, 318 may be handled independently from each other. The first subscription node 315 may be a HSS or a UDM. The second subscription node 318 may be a HSS or a UDM. The reference point between the RAMF 305 and the first subscription node 315 may be referred to as an N8 reference point. This reference point serves the information (e.g. IMSI) that the RAMF 305 needs (UE access over (R)AN 103.

In some embodiments, there is only one subscription node, e.g. the first subscription node 315. In such embodiment, both the RAMF 305 and the SMF 108 may be adapted to communicate with the same subscription node. The reference point between the SMF 108 and the subscription node (e.g. the first subscription node 315 or the second subscription node 318) may be referred to as a N10 reference point. The reference point between the SMF 108 and the subscription node 315, 318 serves what is needed for connectivity. The connectivity ID may be conveyed over this reference point. If the connectivity ID is the same as the UE identity (i.e. when the UE 101 itself acts as application 300 using the same ID as for the mobility), then the subscription node 315, 318 can handle both the (R)AN access and connectivity.

Several applications 300 may use the same connectivity ID. This is analogous to an example where the one having several Android applications using the same Google id on all of them. So the connectivity ID is an identity for the subscription for connectivity to be used by an application 300 and not an identity for the application 300 itself.

FIG. 3 also illustrates a user plane 325 which is adapted to communicate with the UE 101 and a DN 120. The reference point between the user plane 325 and the DN 120 enables exchange of traffic with the DN 120 for connections to the DN 120.

The fat solid line with reference number 330 in FIG. 3 represents the tunnel transporting the application user plane data and is between the UE 101 and the (R)AN 103. A purpose of the tunnel 330 is to separate the connection between the application 300 and the DN 120 from other connections using the same segment, i.e. between the UE 101 and the (R)AN 103. The fat solid line between the (R)AN 103 and User Plane 325 represents the tunnel carrying the user plane traffic for the Application 300 connection to the DN 120. The dotted line with reference number 332 represents the actual user plane transport (through the two tunnels) and is from the Application 300, through the UE 101, (R)AN 103 and through the user plane 325 to the DN 120. The dashed line with reference number 335 (corresponds to the N4 in 5GC) represents the SMF 108 control over the user plane 325. The double solid line with reference number 338 represents the control plane between the UE 101, the RAN 103, the RAMF 305 and the SMF 108. The thin solid line (without any reference number) represents that the nodes on each end of the line are adapted to communicate with each other.

It should be noted that the communication links in the communications system illustrated in FIG. 3 may be of any suitable kind including either a wired or wireless link. The link may use any suitable protocol depending on type and level of layer (e.g. as indicated by the Open Systems Interconnection (OSI) model) as understood by the person skilled in the art.

The method for handling connectivity to a Data Network, DN 120, according to some embodiments will now be described with reference to the signalling diagram in FIG. 4. The method comprises the following steps, which steps may as well be carried out in another suitable order than described below.

Step 401

The RAMF 305 receives, from a UE 101, a request associated with connectivity to the DN 120 for an application 300 having a subscription ID. The subscription ID may have the following form: <user>@<domain>. Thus, the request comprises the subscription ID. The <user> may be a permanent or temporary ID. Using the temporary ID has the advantage of avoiding exposing the permanent ID outside the <domain>. The <user> may be used for finding the subscription data.

Step 402

The RAMF 305 selects, based on at least a part of the subscription ID, which SMF 108, 310 the request should be forwarded to. Thus, the subscription ID contains information which makes it possible to select the SMF 108, 310. The selection may be further based on the temporary ID.

Step 403

The RAMF 305 forwards the request to the selected SMF 108, 310.

The selected SMF 108, 310 receives, from the RAMF 105, the request associated with connectivity to the DN 120 for an application 300 having a subscription ID. The request may comprise the subscription ID. The request may also comprise a connection ID and possibly also a temporary ID. The RAMF 305 may store the connection ID and subscription ID with a temporary ID to be associated with the SMF ID. The temporary ID may include information that the RAMF 305 can resolve to the SMF destination. The RAMF 305 can communicate directly with the SMF 108, 310 when the addressing information is available at the RAMF 305. Initially, the addressing information is not available.

The request may comprise a temporary ID or the SMF 108, 310 may assign a temporary ID. The temporary ID may be for at least a part of the subscription ID. A temporary ID may also be referred to as a short term ID, an impermanent ID or a provisional ID. The temporary ID may be valid for a certain time period. A temporary ID may become invalid while the permanent ID remains. The temporary ID may be used for second or higher number of requests. The temporary ID may be replaced with a new value as needed. The SMF 108, 310 may delete (implicit disconnect) the information about the connection and release the corresponding resources. If the temporary ID becomes invalid without replacement, the method may be restarted using the permanent ID.

Step 405

The SMF 108, 310 determines whether the request is accepted.

Step 406

The SMF 108, 310 transmits, to the RAMF 105, accept information indicating whether the request has been accepted, the temporary ID, a SMF ID and a connection ID.

Figure 4:
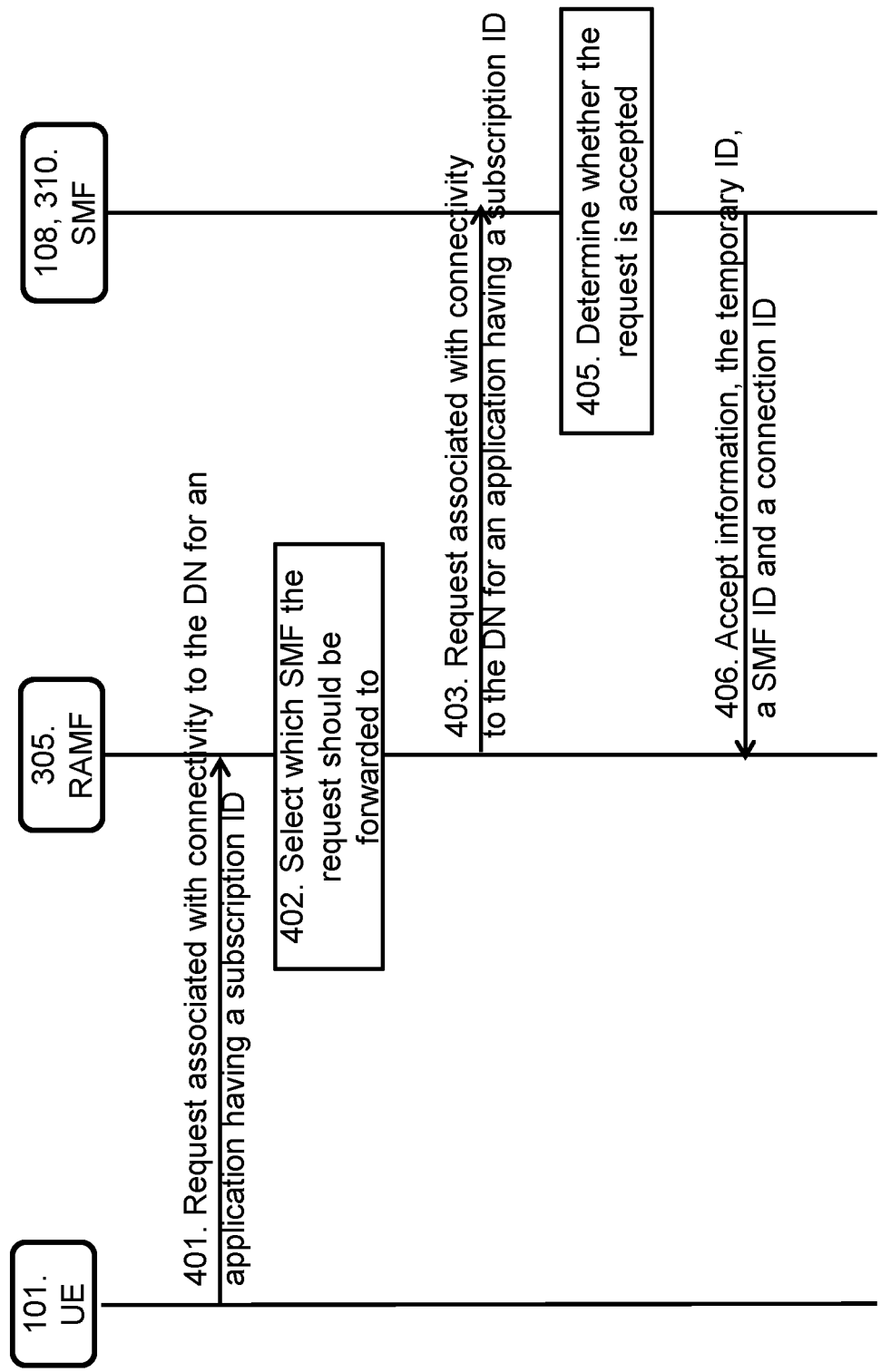
FIG. 4 is a signaling diagram illustrating an example method.
Figure 5A:
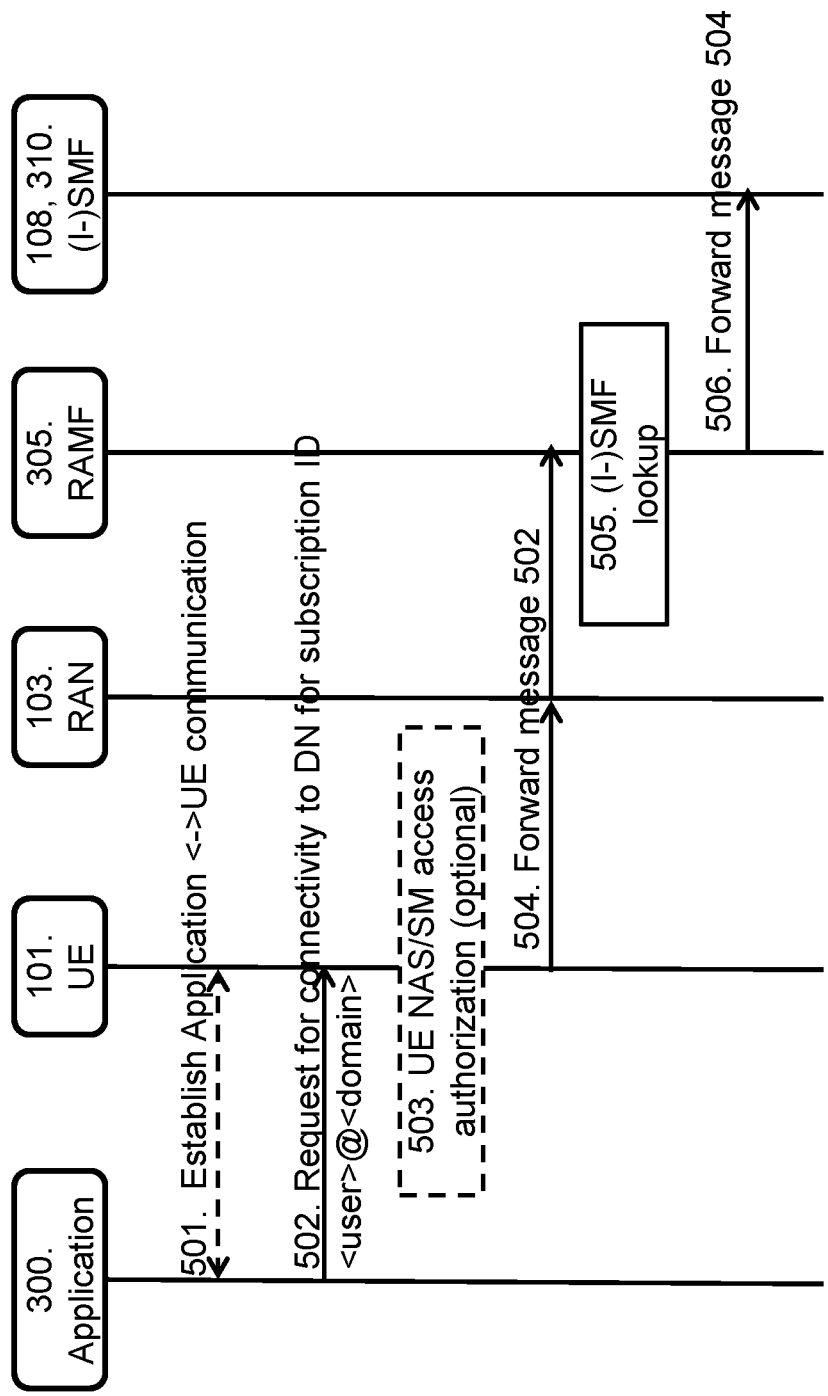
FIG. 5a is a signaling diagram illustrating an example method.
Figure 5B:
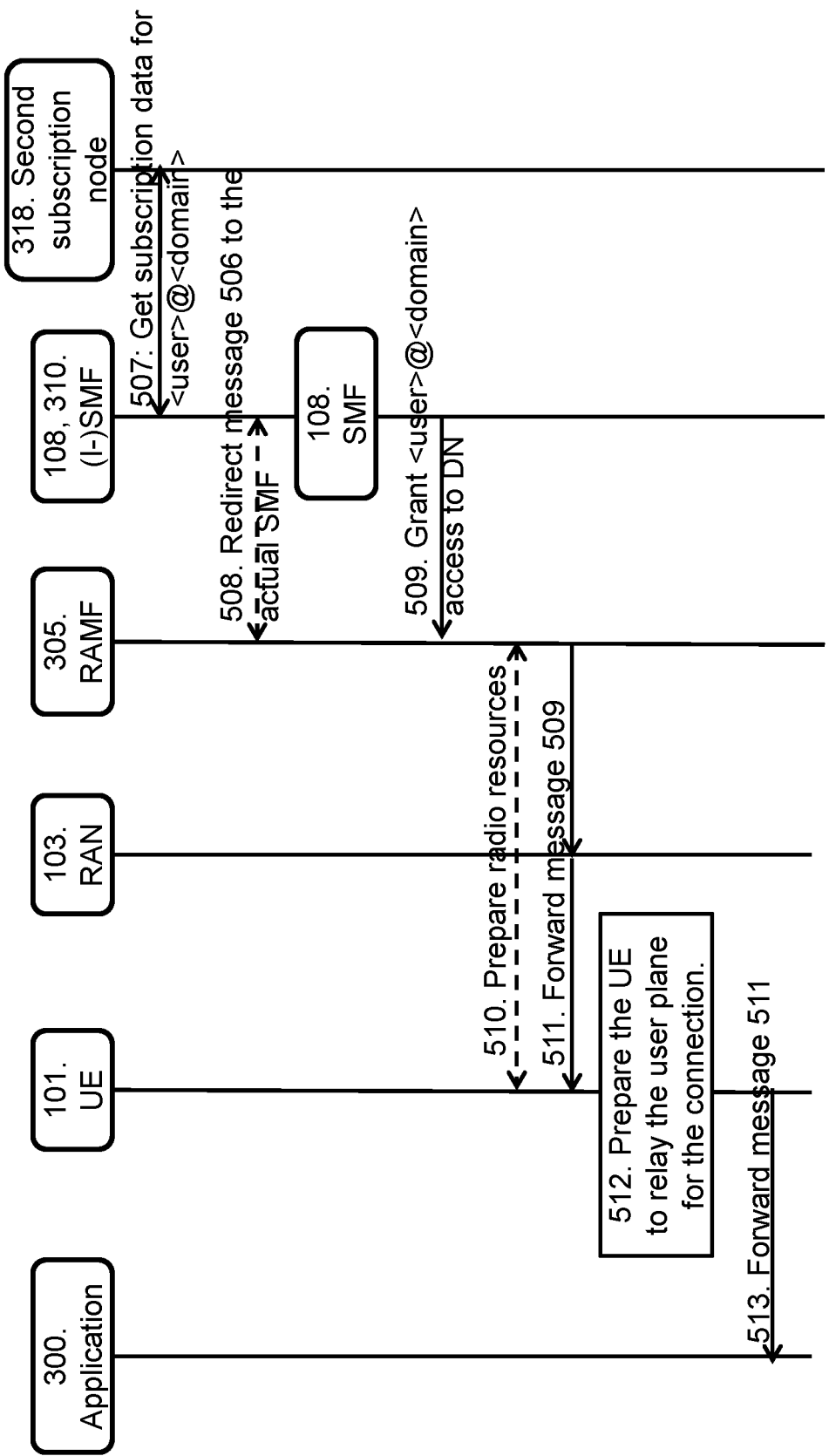
Figure 6:
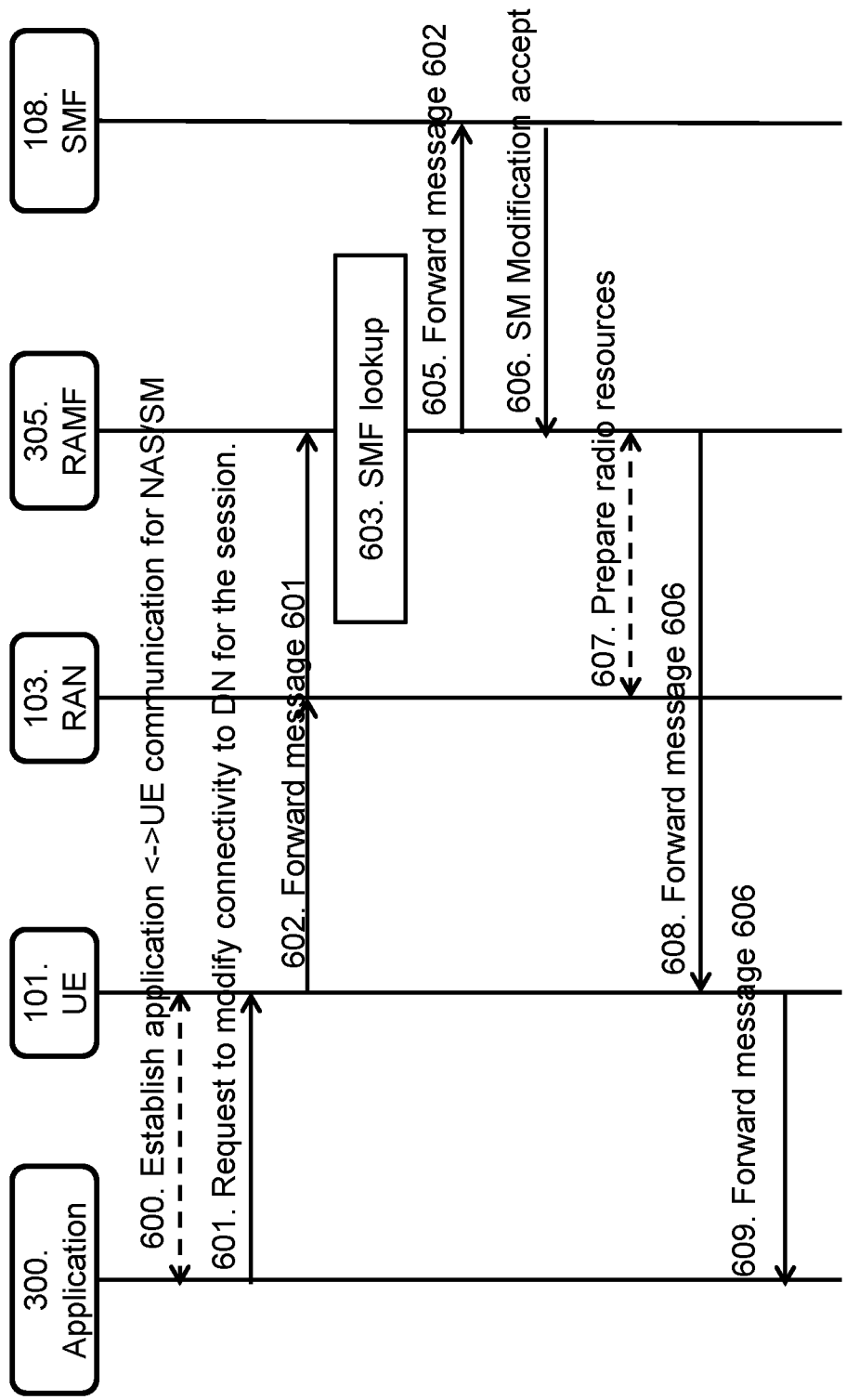
FIG. 6 is a signaling diagram illustrating an example method.

Further details regarding the method illustrated in FIG. 4 will now be described with reference to FIGS. 5a and 5b illustrating connectivity establishment, FIG. 6 illustrating connectivity user plane modification and FIGS. 7a and 7b illustrating UE to UE handover for an application.

The method for handling connectivity to a DN 120, according to some embodiments will now be described with reference to the signalling diagram in FIG. 5a and FIG. 5b. FIG. 5a comprises steps 501-506 and FIG. 5b comprises steps 507-513. Steps 501-506 is performed before steps 507-513, i.e. FIG. 5b is a continuation of FIG. 5a. A dotted arrow may indicate an optional step. The method comprises the following steps, which steps may as well be carried out in another suitable order than described below:

A prerequisite in FIG. 5 may be that the UE 101 is NAS/MM registered at the RAMF 305 and can do control signalling with the RAMF 305. The UE ID may be of type IMSI.

Step 501

This step is seen in FIG. 5a. Communication between the application 300 and the UE 101 is established for NAS/SM. This step is performed if the application 300 is separate from the UE 101.

Step 502

This step is seen in FIG. 5a. The application 300 sends, to the UE 101, a request for connectivity to the DN 120 for the subscription ID<user>@<domain>. The request may be referred to as an initial request. All contents of the request, except the message type and subscription ID may be encrypted. The encrypted parts must be decodable/decryptable at the SMF 108, 310. The SMF 108, 310 may decrypt and validate the actual user part of the subscription ID.

The UE 101 receives the request from the application 300.

The Initial request comprises the Subscription ID. The Subscription ID may be in the following form <user>@<domain>. The <user> is either permanent subscription ID, or a temporary identity. The APN may be in the form of a fully qualified domain name (FQDN).

Step 503

This step is seen in FIG. 5a. The UE 101 performs UE NAS/SM access authorization (optional). The UE operates as "firewall" for NAS/SM messages.

Step 504

This step is seen in FIG. 5a. This step corresponds to step 401 in FIG. 4. The UE 101 forwards the message from step 502 to the RAMF 305, i.e. the request for connectivity to data network (DNN) for subscription ID<user>@<domain>. The RAMF 305 receives the message from the UE 101. The RAMF 305 stores the subscription ID association to:

The UE 101 (for the RAN+UE transport), and

The SMF 108 for later routing (e.g. the (I)-SMF lookup in step 505 below and translating the temporary ID/connection ID to SMF ID).

Step 505

This step is seen in FIG. 5a. This step corresponds to step 402 in FIG. 4. The RAMF 305 performs a (I-)SMF lookup for <domain>, e.g. a Domain Name Server (DNS) lookup. The result of the lookup is used for addressing message 506. In other words, the RAMF 305 routes the message based on <domain>. The temporary ID may comprise information which makes it possible to select the SMF 108, 310.

Step 506

This step is seen in FIG. 5a. This step corresponds to step 403 in FIG. 4. The RAMF 305 forwards the message from step 504 to the (I-)SMF 108, 310 it found in step 505. Thus, the RAMF 305 forwards the request for connectivity to data network (DN) for subscription ID <user>@<domain> to the (I-)SMF 108, 310.

As mentioned in step 502, all contents of the request message, except the message type and subscription ID may be encrypted. This is the case for when the RAMF 305 should forward the request to the appropriate domain. The domain (e.g. represented by the I-SMF 310) must however decode the user part as well and each application 300 has its own keys for encryption, so for that sake the <user> cannot be encrypted, but may be temporary, in the initial request. In this case the key for decryption is retrieved from the subscription database, or from an SMF 108, 310 (in case the RAMF 05 could not address the right SMF 108, 310, but the I-SMF 310 can do so based on the temporary ID). Using a temporary ID may fail, so the UE must restart using the permanent ID. The RAMF 305 uses the <domain> to direct to that domain (to the appropriate ((I-)SMF 108, 310), while the domain uses the <user> to authentication and retrieve subscription data as well as the network's keys for encryption (potentially allowing the remaining part of the request to be encrypted).

In the embodiments herein, the authentication is done prior to the establishment of such connectivity (and even before selection where to serve the connectivity). This is different compared to the prior art where the authentication occurs associated with the connection to the DN 120.

Step 507

This step is seen in FIG. 5b. This step corresponds to step 404 in FIG. 4. The (I-) SMF 108, 310 gets the subscription data for <user>@<domain> from the second subscription node 318. Recall that the second subscription node 318 is the subscription node for connectivity.

The SMF 108 stores at the second subscription node 318:

A temporary ID to use in the future.

A connection ID (not to confuse with the subscription ID).

The I-SMF 310, which cannot serve the connectivity itself, selects a new SMF 108 within the <domain>.

In some embodiments, the temporary ID is not known at the SMF 108, 310, then the application 300 needs to use its actual user part of the subscription ID. The I-SMF 310 then generates the response to the application 300 to instruct the application 300 to re-try to send the request with the actual user ID The (I-)SMF 108, 310 may use the subscription ID to look up the subscription data. In case of a temporary ID, the subscription data may contain key(s) for decrypting the remaining parts of the request. For accepting the request there must be a subscription record for the DNN in the request. The join operation (illustrated in FIG. 7) may include the connection ID for the existing connection, which enables the SMF 108, 310 lookup of the connection and to handle the join operation.

Step 508

This step is seen in FIG. 5b. In case the <domain> uses slicing (or for any other reason necessary), the message 506 is redirected by the I-SMF 310 to the actual SMF 108. This step is an optional step.

The I-SMF 310 does authorization for the APN and selects the SMF 108 and either a) forwards the message to the SMF 108 or b) re-directs the RAMF 305 to the SMF 108.

With step 508, the slice selection (i.e. the SMF selection) becomes associated with the applications's subscription instead of the UE subscription at the first subscription node 315. This provides a flexible solution compared to using the UE subscription for slice selection.

Step 509

This step is seen in FIG. 5*b*. This step corresponds to step 406 in FIG. 4. The RAMF 305 receives a message for grant <user>@<domain> access to DN 120 from the SMF 108. The message includes the temporary ID for the Application 300 to use for the <user> in the subscription ID, the Connection ID stored at the SMF as well as instructions for the AN set-up of radio resource.

Step 510

This step is seen in FIG. 5*b*. Based on the grant in step 509, the RAMF 305 may prepare radio resources between the RMAF and the UE 101.

Step 511

This step is seen in FIG. 5*b*. The RAMF 305 forward the message from step 509 to the RAN 103, and the RAN 103 forwards the message further to the UE 101. The forwarded message is grant <user>@<domain> access to DN 120. The forwarded message comprises the temporary ID and the connection ID.

Step 512

The UE 101 prepares itself to relay the user plane for the connection, c.f. step 510.

Step 513

This step is seen in FIG. 5*b*. The UE 101 forwards message 511 (Grant <user>@<domain> access to DN 120) to the application 300. The application 300 stores the temporary ID and connection ID for reference to the connection in subsequent signalling.

The method for handling connectivity to a DN 120, according to some embodiments will now be described with reference to the signalling diagram in FIG. 6. As mentioned above, FIG. 6 relates to connectivity user plane modification. A dotted arrow may indicate an optional step. The steps in FIG. 6 may be seen as being performed after the steps in FIGS. 5*a* and 5*b*, i.e. FIG. 6 is a continuation of FIGS. 5*a* and 5*b*. The method comprises the following steps, which steps may as well be carried out in another suitable order than described below:

A prerequisite for steps 601-610 is that the application 300 has a connection with the SMF 108 using NAS/SM tunnelled via the UE↔RAMF and routed to the SMF 108 by the RAMF 305. The subscription ID is either <user>@<domain> or a temporary ID that the SMF 108 has generated. The application 300 uses the Connection ID that the SMF 108 has provided to the RAMF 305 which has retained it and its association to the SMF 108.

Step 600

This step corresponds to step 501 in FIG. 5*a*. Communication between the application 300 and the UE 101 is established for NAS/SM. This step is performed if the application 300 is separate from the UE 101. Step 600 is only needed if the connection which was created in step 501 in FIG. 5*a* has been lost.

Step 601

This step corresponds to step 601 in FIG. 6. The application 300 sends a request message to the UE 101. The request message is a request to modify connectivity to the DN 120 for the session. The subscription ID is <user>@<domain> or a temporary ID for the session. Everything in the request message, except the message type and subscription ID and connection ID may be encrypted. The complete request message must be decodable at the SMF 108. This request in step 601 may be referred to as a subsequent request (in contrast to the initial request in step 501 in FIG. 5*a*).

The subsequent request comprises at least one of the following parameters: Subscription ID and Connection ID. The Subscription ID may have the following form <subscriptionID@<domain>, and the subscriptionID may be a temporary identity. The subscriptionID (i.e. the temporary identity) may be encrypted (application↔SMF).

An example of a modification may be to change the QoS treatment of specific user plane traffic. C.f. (GPRS) PDP Context Modification and (EPS) Bearer modification request.

Step 602

This step corresponds to step 401 in FIG. 4 and step 504 in FIG. 5*a*. The UE 101 forwards the message 601 to the RAMF 305 via the RAN 103 using the tunnel in the NAS/MM signaling path signaling.

Step 603

This step corresponds to step 402 in FIG. 4 and step 505 in FIG. 5*a*. The RAMF 305 performs a SMF lookup, i.e. it determines a SMF 107. The lookup is based on the subscription ID and/or the connection ID and the stored association to and SMF. A subscription ID in the form of a temporary ID may be formed so that the SMF destination can be derived from the temporary ID. The result is used for addressing message 605. In other words, the RAMF 305 performs routing of the message 605 based on the subscription ID or Connection ID. Summarized, the alternatives are:
 a) The SMF address can be derived from the temporary ID, including the domain part, alone; or
 b) The RAMF 305 has stored the SMF address to use for a specific connection ID.

Step 605

This step corresponds to step 403 in FIG. 4 and step 506 in FIG. 5*a*. The RAMF 305 forwards the message from step 602 to the SMF 108, i.e. the request to modify connectivity.

Step 606

This step corresponds to step 406 in FIG. 4 and step 509 in FIG. 5*b*. The SMF 108 sends a SM Modification accept message to the RAMF 305. The SMF 108 responds indicating the Connection ID. The SMF 108 may change the temporary ID and store the temporary ID in the second subscription node 318 and include it in the SM Modification accept. The RAMF retains the new temporary ID for later routing purposes.

Step 607

This step corresponds to step 510 in FIG. 5*b*. The RAMF 305 may prepare radio resources between itself and the RAN 103.

Step 608

This step corresponds to step 511 in FIG. 5*b*. The RAMF 305 forwards the message from step 606 to the UE 101. The message may be forwarded using the tunnel in the NAS/MM signaling path.

Step 609

This step corresponds to step 513 in FIG. 5*b*. The UE 101 forwards the message from step 606 to the application 300. The forwarded message is the SM Modification accept. The forwarded message may include a new temporary ID to be used in future signalling.

Figure 7:
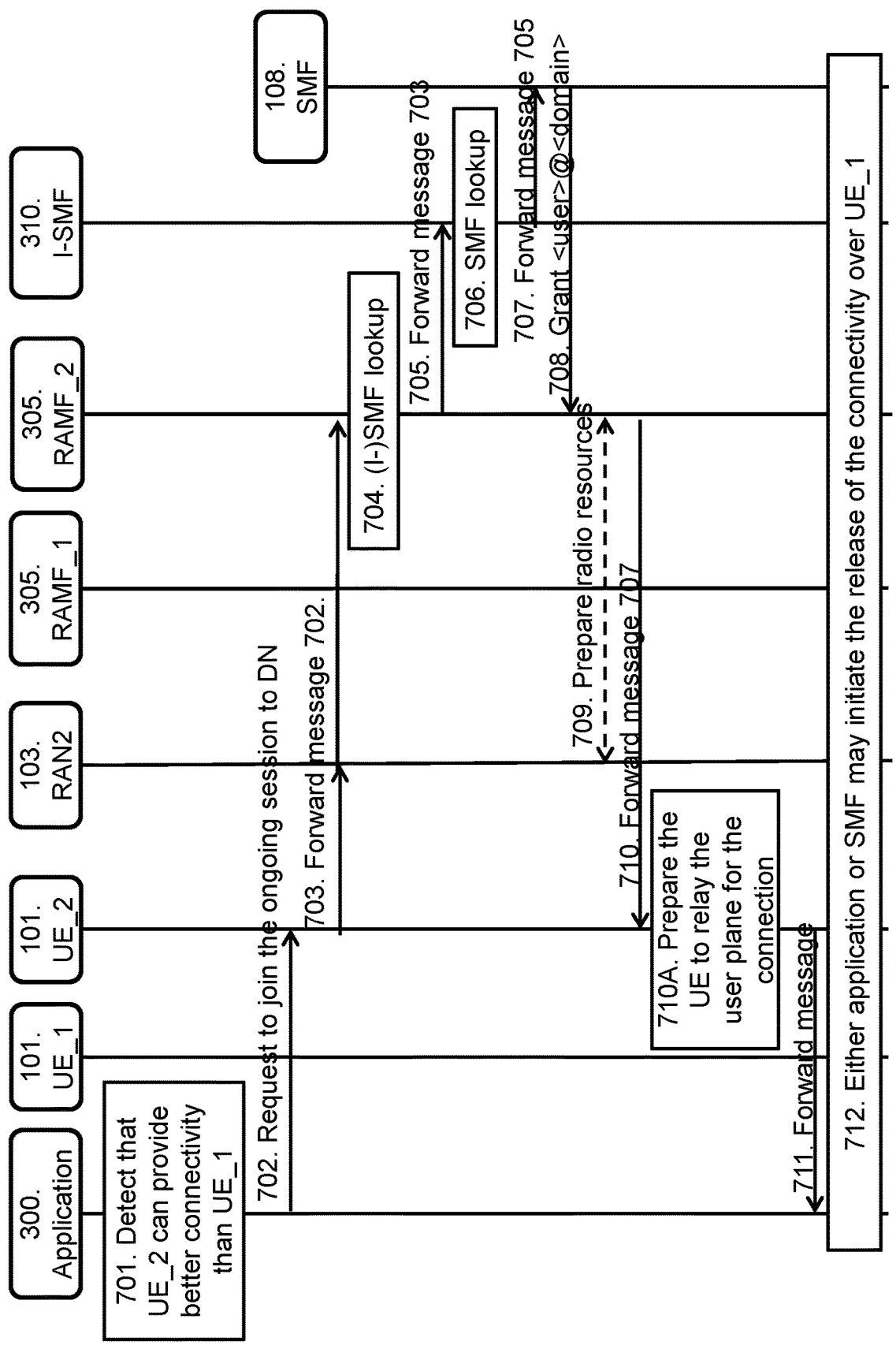
FIG. 7 is a signaling diagram illustrating an example method.

The method for handling connectivity to a DN 120, according to some embodiments will now be described with reference to the signalling diagram in FIG. 7. As mentioned above, FIG. 7 relates to UE to UE dual access (over separate accesses for a single connection to the same DN) or handover for the application 300. A dotted arrow may indicate an optional step. FIG. 7 comprises two UEs 101, i.e. UE_1 and UE_2, a RAN_2 103 which serves UE_2 101, and two RAMFs 305, i.e. RAMF_1 and RAMF_2. The method in FIG. 7 may be referred to a method describing a join procedure. The steps in FIG. 7 may be performed after the steps in FIG. 5b or 6, i.e. FIG. 7 may be seen as a continuation of FIG. 5b or 6. The method illustrated in FIGS. 7a and 7b can also be used to add a new access path for an ongoing session. Note that, to complete a handover, the old access path need to be torn down.

A prerequisite for FIG. 7 is that the application 300 has a connection with the SMF 108 using NAS/SM tunneled via UE_1↔RAMF_1 and routed to the SMF 108 by the RAMF 305. The subscription ID is either <user>@<domain> or a temporary ID that SMF 108 has generated. The temporary ID is optionally organized so that the first request is directed to the appropriate SMF 108, without the involvement of an I-SMF 310.

The method comprises the following steps, which steps may as well be carried out in another suitable order than described below:

Step 701

The application 300 detects that the UE_2 101 can provide better connectivity than UE_1 101. The application 300 is already connected via UE_1 101, having a connection ID for the connection to the DN 120. Communication between the application 300 and the UE_2 101 is established for NAS/SM.

Step 702

This step corresponds to step 502 in FIG. 5a. The application 300 sends a request message to the UE_2 101. The request is to join the ongoing session to the DN 120. The request message comprises the Subscription ID which is <user>@<domain> or <temporary_ID>@<domain>. A connection ID which the I-SMF 310 can resolve to an actual SMF 108 is also included in the request message.

All but the message type and <domain>, Subscription ID and connection ID may be encrypted. The whole request message must be decodable at the SMF 108. The request in step 702 may be referred to as a join request since it is a request to join the ongoing session. The join request may comprise at least one of the following parameters: Subscription ID, and/or Connection ID. The Subscription ID may be in the following form <subscriptionID>@<domain>, where the subscriptionID is a temporary identity.

Step 703

This step corresponds to step 401 in FIG. 4, step 504 in FIG. 5a. The UE_2 101 forwards the message 702 to the RAMF_2 305 via the RAN2 103. The message is forwarded using the tunnel in the NAS/MM signaling path.

Step 704

This step corresponds to step 402 in FIG. 4, step 505 in FIG. 5a. The RAMF_2 305 performs a (I-)SMF lookup for <domain> and optionally the temporary ID. The result is used for addressing message 705. In other words, the RAMF_2 305 routes on <domain>. The <user> part of the subscription ID may be a temporary ID that can be used for SMF addressing.

Step 705

This step corresponds to step 403 in FIG. 4, step 506 in FIG. 5a. The RAMF_2 305 forwards the message 703 to the (I-)SMF 310/108 which was looked up in step 704. The message is a request to join the session.

Step 706

This step corresponds to step 402 in FIG. 4, step 505 in FIG. 5a. The I-SMF 310 performs a SMF lookup in the second subscriber node 315 (e.g. UDM). The key for the lookup is <user> and the connection ID. In this step, the I-SMF 310 acts as a selector or redirector which redirects the message to the SMF 108 handling the connection served by UE_1 101. This step may be performed in case the network applies slicing. The slice selection is therefore connected to the user's subscription, and not to any UE 101 subscription, which provides flexibility.

The I-SMF 310 forwards the first request to the SMF 108 while RAMF_2 305 is, in step 708, prepared to send future requests directly to the selected SMF 108.

Step 707

This step corresponds to step 403 in FIG. 4, step 506 in FIG. 5a. The I-SMF 310 forwards the message 705 to the SMF 108. The message is a request to join the session.

Step 708

This step corresponds to step 406 in FIG. 4, step 509 in FIG. 5b. The SMF 108 sends a grant message with <user>@<domain> to the RAMF_2 305. The message is associated with joining the session to the DN 120. The SMF 108 responds indicating the Connection ID.

Step 709

This step corresponds to step 510 in FIG. 5b. The RAMF_2 305 may prepare radio resources between itself and the RAN_2 103.

Step 710

This step corresponds to step 511 in FIG. 5b. The RAMF_2 305 forwards the message 707 to the UE_2 101 using the Tunnel in the NAS/MM signaling path. The forwarded message is to grant <user>@<domain> to join the connection to access the DN 120. The forwarded message comprises the temporary ID and the connection ID.

Step 710A

The UE_2 101 prepares itself to relay the user plane for the connection. This step is done because the UE_2 101 has no prior connection, the UE_2 101 needs to do same things as the UE_1 did in its step 512 in FIG. 5b.

Step 711

This step corresponds to step 513 in FIG. 5b. The UE_2 101 forwards message 708 to the application 300, i.e. the grant to joining the session to the DN 120.

Step 712

At handover, either the application 300 or the SMF 108, 310 may initiate the release of the connectivity over UE_1 101. Step 712 does not take place for dual connectivity over both the UE_1 and UE_2 (i.e. dual connectivity).

Summarized, FIGS. 5, 6 and 7 illustrate the identity handling in three different example scenarios. FIG. 5 illustrates an initial request, FIG. 6 illustrates a modification of a connection and FIG. 7 illustrates joining to an ongoing connection (so that there are two connection ways between the DN 120 and the application 300).

Figure 8:
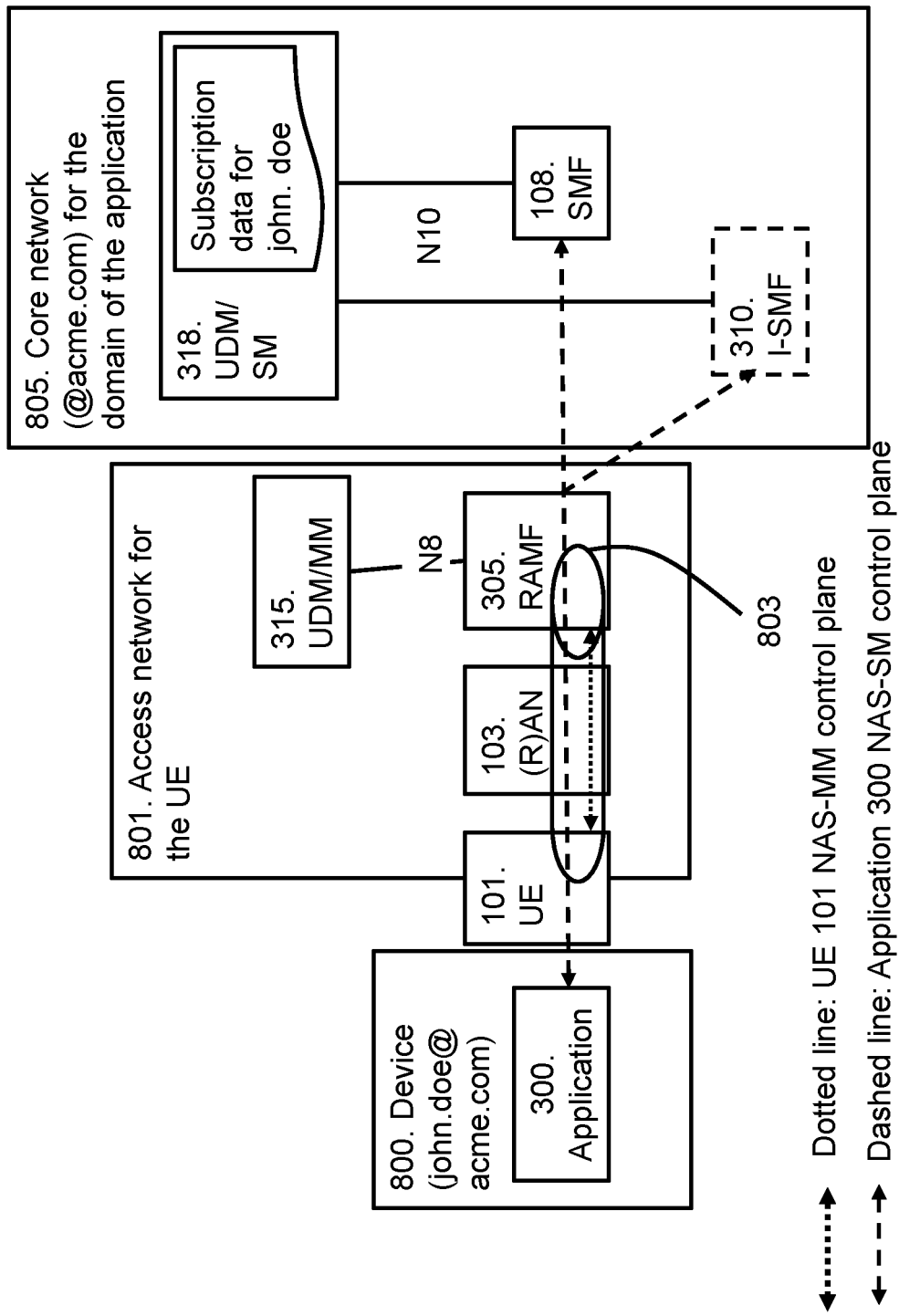
FIG. 8 is a schematic block diagram illustrating an embodiment of the control signalling part a communication system.

FIG. 8 illustrates an example of an overall network set-up. In FIG. 8, the subscription ID with the form <user>@<domain> is exemplified as john.doe@acme.com. The <user> part of the subscription ID is exemplified as john.doe and the <domain> part of the subscription ID is exemplified with acme.com.

In FIG. 8, the application 300 is exemplified to be located in a device 800. The application 300 is adapted to communicate with the UE 101. Using other words, the application 300 is behind the UE 101. The access network 801 for the UE 101 comprises the (R)AN 103 and the RAMF 305. The first subscription node 315 is exemplified in FIG. 8 with a Unified Data Management/Mobility Management (UDM/

MM) node. The RAMF 305 is adapted to communicate with the UDM/MM 315 via a N8 reference point in FIG. 8. The tunnel 803 going from the UE 101 to the RAMF 305 represents the channel for control signaling between the Application 300 and the SMF 108 on that segment.

The core network 805 for the domain (@acme.com) of the application 300 is exemplified to comprise the SMF 108, and optionally the I-SMF 310. The core network 805 further comprises the second subscription node 318 exemplified by a Unified Data Management/Session Management (UDM/SM) node in FIG. 8. The UDM/SM comprises subscription data for the connectivity that user john.doe is authorized to use. The I-SMF 310 and/or the SMF 108 are adapted to communicate with the UDM/SM 318. The reference point between the I-SMF 310 and/or the SMF 108 and the UDM/SM 318 is exemplified with a N10 reference point.

The dotted arrow between the application 300 and the SMF 108 represents the application control signaling path for its connectivity. The dotted arrow between the UE 101 and the RAMF 305 represents the UE mobility signaling path for the UE registration with the RAMF 305.

The dotted box around the I-SMF 310 indicates that the I-SMF 310 is an optional entity, which need to be present when the RAMF cannot make the proper SMF selection without support from the <domain>, for example in a scenario applying slicing. Consequently, the dotted arrow between the RAMF 305 and the I-SMF 310 illustrates that the RAMF 305 and the I-SMF 310 is adapted to communicate with each other only in such scenario.

The UE 101 may apply an access policy to control which applications 300 may do tunneled SM NAS signaling. This means that at least one of the following procedures may be performed:
 The UE 101 may forward SM NAS messages from the application 300.
 The RAMF 305 may route the first SM NAS message based on the domain in the subscription ID.
 The selected domain may include a redirect function to divert the RAMF 305 to contact a specific SMF 108. This includes the slice selection, where applicable.

Assuming an example where the application 300 has the subscription ID john.doe@acme.com and the UE 101 admits the application 300 to do tunneled SM NAS signaling. The SM NAS signaling has the core network domain 805 readable for the RAMF 305, which uses the domain ("acme.com") to route the SM NAS message to the appropriate destination, using an addressing method that is agreed among operators. Examples of the addressing method are DNS lookup, Diameter Destination Realm etc. The actual SM NAS protocol does not need to be understood by the RAMF 305.

The core network domain 805 may include an I-SMF 310 that uses the user part of the subscription ID to find and/or establish the credentials for the application 300 and decode the SM NAS message. Techniques for protecting the core network private identity of the application 300 may be applied). The I-SMF 310 includes the slice selection for the application 300 and directs the SM NAS request to the appropriate SMF 108.

For the subscription ID (e.g. john.doe@acme) to gain connectivity with a PDN connection, there are some prerequisites. The RAMF 305 can detect and route SM signaling. The UE 101 may have the capability to discover, be discovered by and admit and/or allow client devices 800 (c.f. ProSe discovery) to connect via the UE 101 and the client device is in contact with the UE 101. The access network subscription data for the UE 101 may include authorization and screening data to allow and/or deny applications 300 (possibly located in a client device 800) to connect via the UE 101. The application's 300 home domain is routable from the RAMF 310. I.e. The RAMF 305 can communicate application NAS messages with the application's home domain (@acme.com). The core network 805 of the application's home domain supports the selection of the core network slice. The core network 805 of the application's domain supports the selection of the appropriate SMF 108.

The following steps 1)-8) describe an example of the procedure for application 300 gaining connectivity to a DN 120. This procedure is here to illustrate the environment and the addressing. Details of the set-up of connectivity are not included:

Step 1)

This step corresponds to step 401 in FIG. 4 and step 502 in FIG. 5*a*. The application 300 issues a request for connectivity (towards a specific APN/DN 120) to the UE 101. The request may be encrypted, using a temporary ID from a previous session or be based on the user part of the Subscription ID (e.g. john.doe). A signed envelope may include the temporary ID and domain (e.g. guti_1234567890987654321@acme.com) which is readable for the UE 101 (and the RAMF 305).

Step 2)

This step corresponds to step 401 in FIG. 4 and step 504 in FIG. 5*a*. The UE 101 forwards the request to the RAMF 305.

Step 3)

This step corresponds to step 403 in FIG. 4 and step 506 in FIG. 5*a*. The RAMF 305 uses the domain part of the subscription ID (e.g. @acme.com) and an addressing scheme (plain DNS, Diameter realm, SLP, . . . ) to forward the request towards the domain. The RAMF 305 uses, if present, the possible encoding in the temporary ID that indicates what specific SMF 108 to receive the request.

Step 4)

This step corresponds to step 507 in FIG. 5*b*. The application's 300 home domain (represented by I-SMF 310) uses the temporary ID to determine the keys for decoding the request (I-SMF 310 or SMF 108).

Step 5)

This step corresponds to step 508 in FIG. 5*b*. In case of an I-SMF 310, it selects an SMF that serves the requested Data Network Name in, when applicable, in a slice that is applicable for the request and re-directs the request to that SMF 108. It may be possible to use the subscription data for the application ID in selecting the slice. The re-direction may be either instructing the RAMF 310 to contact the SMF 108, or the I-SMF 310 may forward the request to the applicable SMF 108.

Step 6)

This step corresponds to step 509 in FIG. 5*b*, step 606 in FIG. 6 and step 708 in FIG. 7. The SMF 108 establishes a session with the DN 120 serving the requested Data
 Network Name and responds to the RAMF 305 with
 The necessary information for the RAMF 305 to establish the RAN part of the session (c.f. the N2 of 5GS) and be aware of the connectivity, and/or
 The accept message to the request for connectivity.

Step 7)

This step corresponds to step 511 in FIG. 5*b*. The RAMF 305 forwards the accept message to the UE 101 for further forwarding to the application 300, and the RAMF 305 informs the UE 101 that the application 300 can use the RAN 103.

Step 8)

This step corresponds to step 513 in FIG. 5b. The UE 101 forwards the accept message to the application 300. The UE 101 may also inform the application 300 as to what local procedures shall be used for the connectivity.

Figure 9:
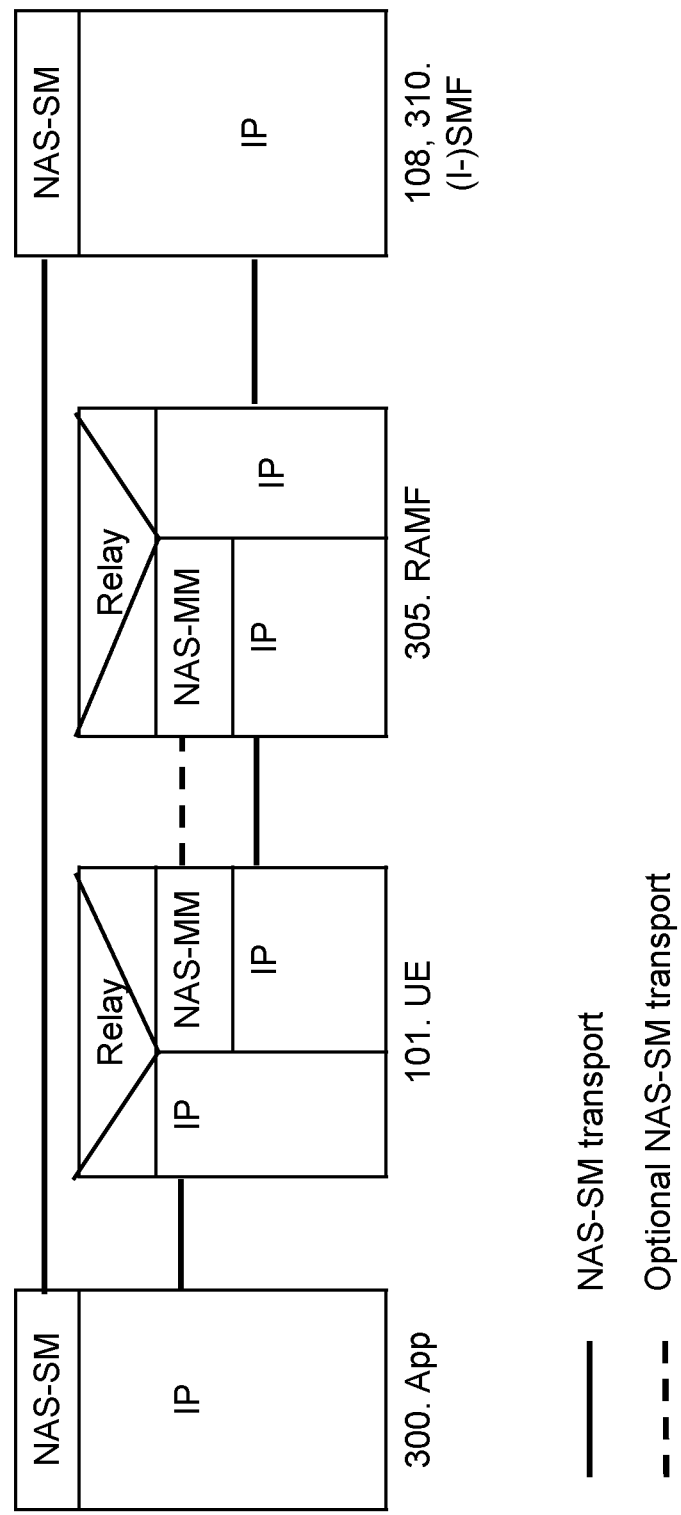
FIG. 9 is a schematic block diagram illustrating an embodiment of a control plane protocol stack.

FIG. 9 illustrates an example of a protocol stack architecture. The continuous lines illustrate the NAS-SM transport and the dotted lines illustrate the optional NAS-SM transport. The illustration shows that the application 300 has a control protocol with the (I-)SMF 108, 310 and that the protocol transport is:
- IP (additions like TCP possible) between the application 300 and UE 101; and
- NAS-MM (the registration and mobility protocol used in the (R)AN 103) between the UE 101 and RAMF 305; and
- IP (additions like TCP, GRE etc. possible) between the RAMF 305 and the (I-)SMF 108, 310.

The illustration in FIG. 9 also shows that the UE 101 as well as the RAMF 305 includes a relay function to route messages to their appropriate destinations. The routing uses data in the message and from the node itself to route messages for ongoing sessions, e.g. the RAMF 305 translates the application subscription ID and connection ID to an (I-)SMF destination.

Figure 10:
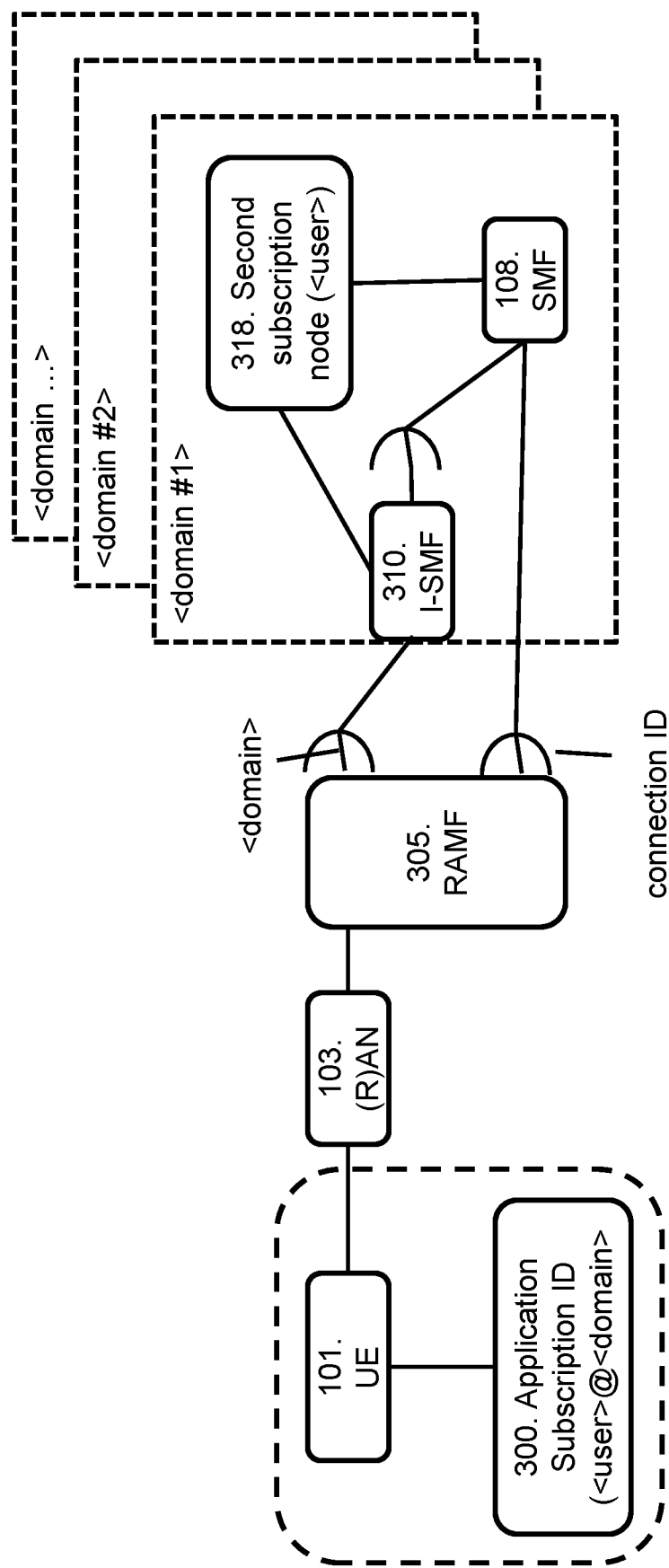
FIG. 10 is a schematic block diagram illustrating an embodiment the control plane of a communication system.

FIG. 10 illustrates some advantages of the embodiments herein. For example, the domains may be isolated from each other. The application 300 may use an ID which is different from the UE's ID. There is a possibility to select a SMF 108, 310 within a domain. The selection that the I-SMF 310 does is the SMF ID that is retrieved from the first subscription node 315, using the user part of the subscription ID (in particular when the user part is a temporary ID) or, for initial requests, using the SMF selection mechanism of the domain.

Figure 11:
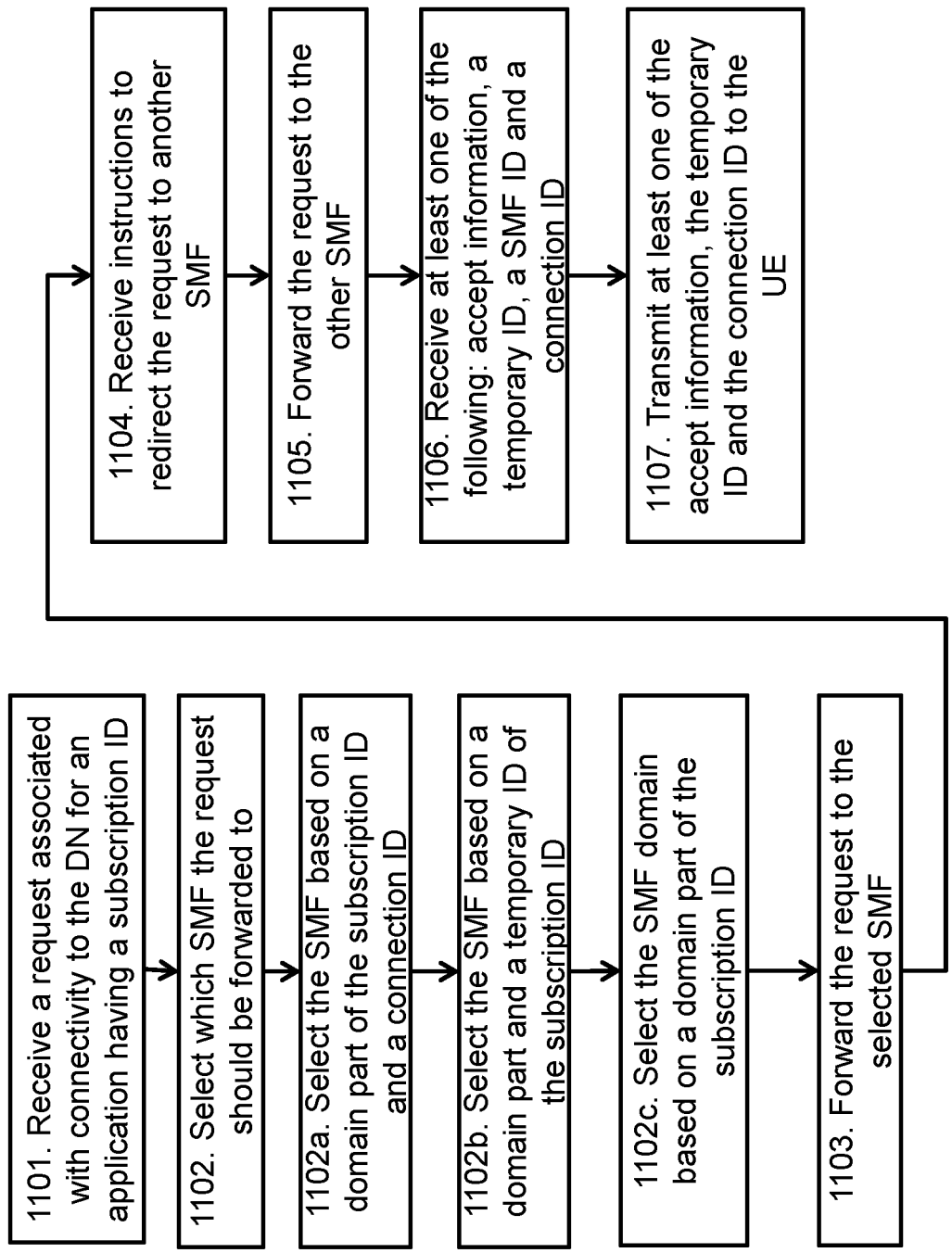
FIG. 11 is a flow chart illustrating an embodiment of a method performed by a RAMF.

The method described above will now be described seen from the perspective of the RAMF 305. FIG. 11 is a flowchart describing the present method in the RAMF 305 for handling connectivity to a DN 120. The method comprises at least one of the following steps to be performed by the RAMF 305, which steps may be performed in any suitable order than described below:

Step 1101

This step corresponds to step 401 in FIG. 4, step 504 in FIG. 5a, step 602 in FIG. 6 and step 703 in FIG. 7. The RAMF 305 receives, from a UE, a request associated with connectivity to the DN 120 for an application 300 having a subscription ID.

The request may be:
- a request for establishing a connection 130 between the application 300 and the DN 120, or
- a request for modifying an already existing connection 130 between the application 300 and the DN 120, or
- a request for the application 300 to join an existing connection using another UE 101 and to the same DN 120.

The application 300 is the same instance for both the existing connection and in the request. Having the same temporary ID and a matching connection ID prevents that two applications 300 joins the same connection to the DN 120.

The request may be received using a mobility management signaling path. The mobility management signaling path may be between the UE 101 and the RAMF 305.

Two or more applications 300 requesting connectivity to the same DN 120 may use the same subscription ID. Even though they request connectivity to the same DN 120, they get separate connections.

The subscription ID may comprise at least an application user part and a domain part. The application user part may be a permanent application user ID or a temporary ID.

The RAMF 305 may have previously registered the UE 101, and the UE 101 may be enabled to transmit and/or receive control signaling to and/or from the RAMF 305.

The application 300 may have an already existing connection 130 to the DN 120 routed via the UE 101, and the existing connection 130 may be identified with a connection ID.

The application 300 may be incorporated in the UE 101, or the application 300 may be a standalone unit which is separate from the UE 101 and which is arranged to communicate with the UE 101.

The request may comprise, in addition to the subscription ID, a connection ID and/or a temporary ID.

Step 1102

This step corresponds to step 402 in FIG. 4, step 505 in FIG. 5a, step 603 in FIG. 6 and steps 704 and 706 in FIG. 7. The RAMF 305 selects, based on at least a part of the subscription ID (e.g. the domain) associated with the subscription ID, which SMF 108, 310 the request should be forwarded to. The SMF selection may be "embedded" in a temporary user ID.

In some embodiments, the connection ID may also be a basis for the selection. For both the connectivity user plane modification described in relation to FIG. 6 and the UE to UE dual access method described in relation to FIG. 7, the subscription ID must include a temporary user-part, which somehow identifies the appropriate SMF 108, 310. (The connection ID is stored at the RAMF 305 together with the UE registration and associated with the temporary user ID). For FIG. 7, the connection ID must be included from the SMF 108, 310 (that is part of the subscription ID).

Step 1102a

This step may be seen as a substep of step 1102. The RAMF 305 may select the SMF 108, 310 based on a domain part of the subscription ID and a connection ID.

Step 1102b

This step may be seen as a substep of step 1102. The step may be performed instead of step 1102a, i.e. it may be an alternative to step 1102a. The RAMF 305 may select the SMF 108, 310 based on a domain part and a temporary ID of the subscription ID.

Step 1102c

This step may be seen as a substep of step 1102. The step may be performed instead of steps 1102a and 1102b, i.e. it may be an alternative to steps 1102a and 1102b. The RAMF 305 may select the SMF 108, 310 based on a domain part of the subscription ID.

Step 1103

This step corresponds to step 403 in FIG. 4, step 506 in FIG. 5a, step 605 in FIG. 6 and step 705 in FIG. 7. The RAMF 305 forwards the request to the selected SMF 108, 310. The request may comprise a temporary ID.

Step 1104

This step corresponds to step 508 in FIG. 5b. The RAMF 305 may receive instructions from an I-SMF 310 to redirect the request to another SMF 108.

Step 1105

This step corresponds to step 508 in FIG. 5b. The RAMF 305 may forward the request to the other SMF 108.

Step 1106

This step corresponds to step 406 in FIG. 4, step 509 in FIG. 5b, step 606 in FIG. 6 and step 708 in FIG. 7. The RAMF 305 may receive, from the SMF 108, 310, at least one of the following parameters:

accept information indicating whether the request has been accepted, and/or a temporary ID for at least a part of the subscription ID (e.g. the domain), and/or a SMF ID, and/or a connection ID.

The connection ID may be a dedicated identity for the application's connection 130 to the DN 120.

The information on the SMF ID may stay at the RAMF 305. The SMF ID may be optionally "encoded" in the temporary ID.

Step 1107

This step corresponds to step 511 in FIG. 5*b*, step 608 in FIG. 5 and step 710 in FIG. 7. The RAMF 305 may transmit at least one of the accept information, the temporary ID and the connection ID to the UE 101. The at least one of the accept information, the temporary ID, and the connection ID may be transmitted using a mobility management signaling path.

Figure 12:
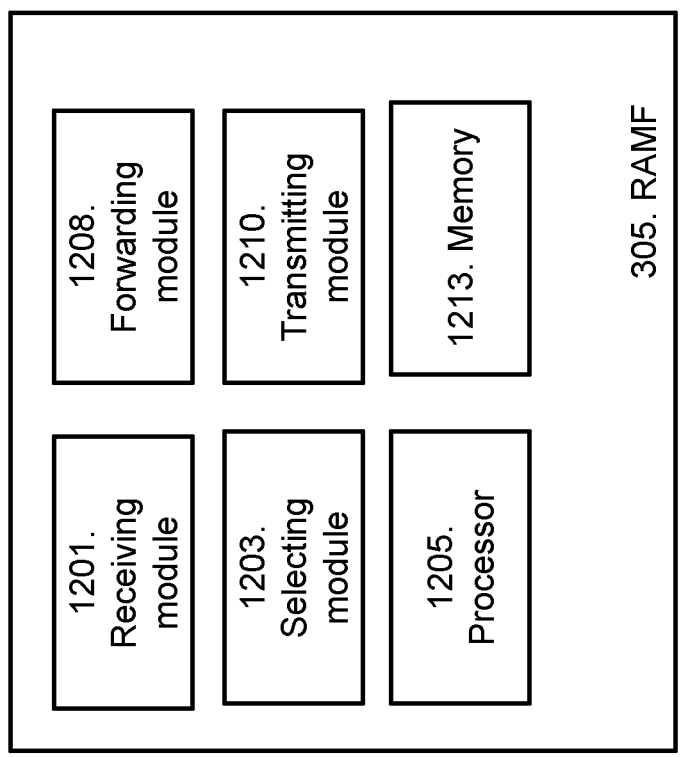
FIG. 12 is a schematic block diagram illustrating an embodiment of a RAMF.

To perform the method steps shown in FIGS. 4-7 and 11 for handling connectivity to the DN 120, the RAMF 305 may comprise an arrangement as shown in FIG. 12. The RAMF 305 may have previously registered the UE 101, and the UE 101 may be enabled to transmit and/or receive control signaling to and/or from the RAMF 305. The application 300 may have an already existing connection 130 to the DN 120 routed via the UE 101, and the existing connection 130 may be identified with a connection ID. The application 300 may be incorporated in the UE 101, or the application 300 may be a standalone unit which is separate from the UE 101 and which is arranged to communicate with the UE 101.

The RAMF 305 may be adapted to, e.g. by means of a receiving module 1201, receive, from a UE 101, a request associated with connectivity to the DN 120 for an application 300 having a subscription ID. The receiving module 1201 may also be referred to as a receiving unit, a receiving means, a receiving circuit, means for receiving, input unit etc. The receiving module 1201 may be a receiver, a transceiver etc. The receiving module 1201 may be a wireless receiver of the RAMF 305 of a wireless or fixed communications system. The request may be;

a request for establishing a connection 130 between the application 300 and the DN 120, or a request for modifying an already existing connection 130 between the application 300 and the DN 120, or a request for the application 300 to join an existing connection using another UE 101 and to the same DN 120.

The request may be received using a mobility management signaling path. Two or more applications 300 requesting connectivity to the same DN 120 may the same subscription ID.

The subscription ID may comprise at least an application user part and a domain part, and the application user part may be a permanent application user ID or a temporary ID assigned by the SMF 108, 310.

The RAMF 305 may be adapted to, e.g. by means of a selecting module 1203, select, based on at least a part of the subscription ID, which SMF 108, 310 the request should be forwarded to. The selecting module 1203 may also be referred to as a selecting unit, a selecting means, a selecting circuit, means for selecting etc. The selecting module 1203 may be a processor 1205 of the RAMF 305.

The RAMF 305 may be adapted to, e.g. by means of the selecting module 1203, select the SMF 108, 310 based on a domain part of the subscription ID and a connection ID, or to select the SMF 108, 310 based on a domain part and a temporary ID of the subscription ID, or to select the SMF 108, 310 based on a domain part of the subscription ID.

The RAMF 305 may be adapted to, e.g. by means of a forwarding module 1208, forward the request to the selected SMF 108, 310. The forwarding module 1208 may also be referred to as a forwarding unit, a forwarding means, a forwarding circuit, means for forwarding etc. The forwarding module 1208 may be the processor 1205 of the RAMF 305

The RAMF 305 may be further adapted to, e.g. by means of the receiving module 1201, receive, from the SMF 108, 310, at least one of the following: accept information indicating whether the request is accepted, a temporary ID for at least a part of the subscription ID, a SMF ID and a connection ID. The connection ID may be a dedicated identity for the application's connection 130 to the DN 120.

The RAMF 305 may be further adapted to, e.g. by means of a transmitting module 1210, transmit at least one of the accept information, the temporary ID and the connection ID to the UE 101. The transmitting module 1210 may also be referred to as a transmitting unit, a transmitting means, a transmitting circuit, means for transmitting, output unit etc. The transmitting module 1210 may be a transmitter, a transceiver etc. The transmitting module 1210 may be a wireless transmitter of the RAMF 305 of a wireless or fixed communications system. In some embodiments, the transmitting module 1201 is the same as the forwarding module 1208. The at least one of the accept information, the temporary ID and the connection ID may be transmitted using a mobility management signaling path.

The RAMF 305 may be adapted to, e.g. by means of the receiving module 1201, receive instructions from an I-SMF 310 to redirect the request to another SMF 108.

The RAMF 305 may be adapted to, e.g. by means of the forwarding module 1208, forward the request to the other SMF 108.

In some embodiments, RAMF 305 comprises a memory 1213. The memory 1213 comprises instructions executable by the processor 1205. The memory 1213 comprises one or more memory units. The memory 1213 is arranged to be used to store data, received data streams, power level measurements, requests, subscription ID, connection ID, accept information, temporary ID, SMF ID, threshold values, time periods, configurations, schedulings, and applications to perform the methods herein when being executed in the RAMF 305.

In some embodiments, a first computer program may comprise instructions which, when executed on at least one processor (e.g. processor 1205), cause the at least one processor to carry out at least some of the method steps in FIGS. 4-7 and 11. A first carrier may comprise the first computer program, and the first carrier is one of an electronic signal, optical signal, radio signal or computer readable storage medium.

Those skilled in the art will also appreciate that the receiving module 1201, the selecting module 1203, the forwarding module 1208 and the transmitting module 1210 described above may refer to a combination of analog and digital circuits, and/or one or more processors configured with software and/or firmware, e.g. stored in a memory (e.g. memory 1213), that when executed by the one or more processors such as the processor 1205 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 13:
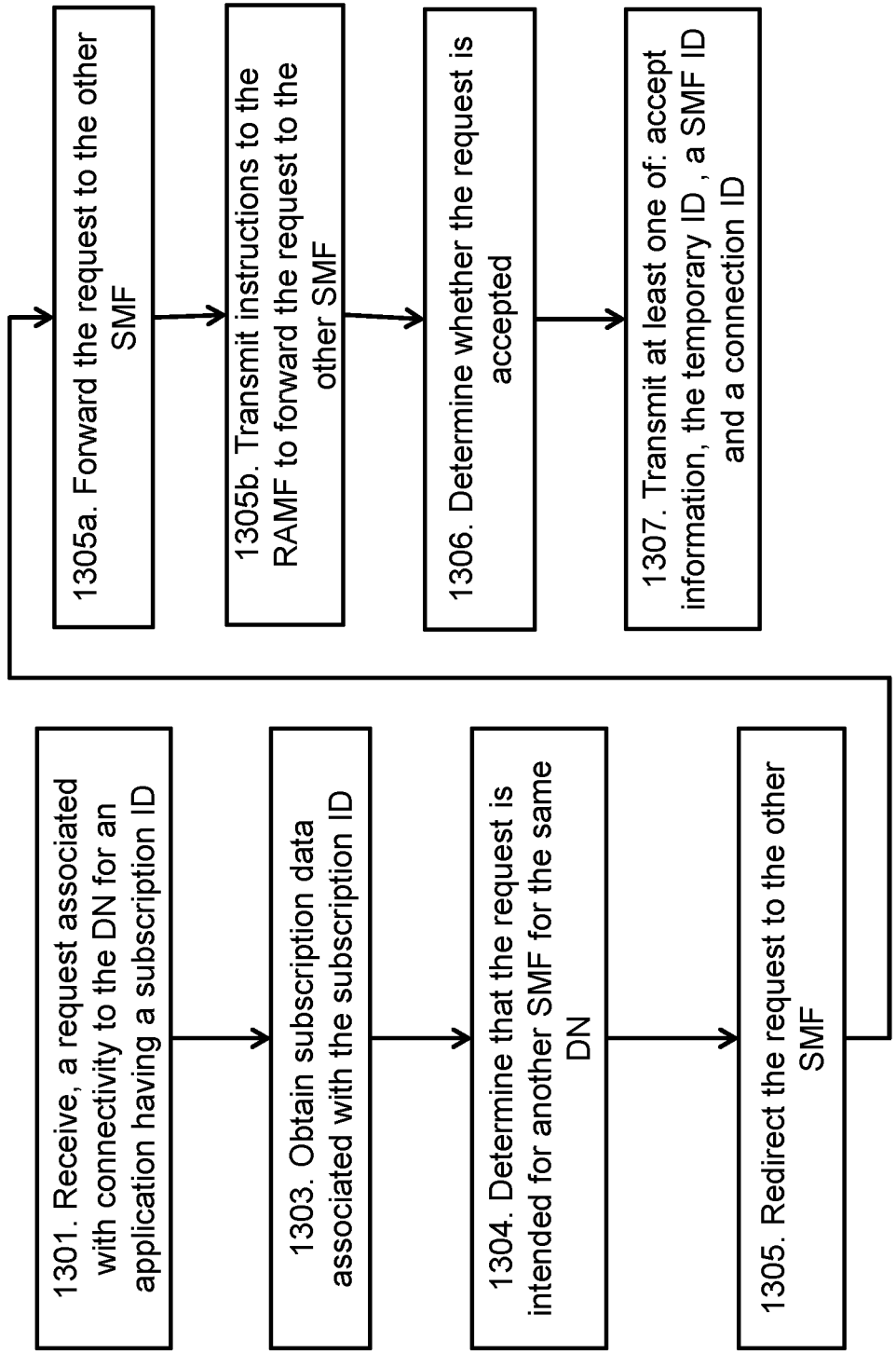
FIG. 13 is a flow chart illustrating an embodiment of a method performed by a SMF.

The method described above will now be described seen from the perspective of the SMF 108, 310. FIG. 13 is a flowchart describing the present method in the SMF 108, 310 for handling connectivity to a DN 120. The method comprises at least one of the following steps to be performed by the SMF 108, 310, which steps may be performed in any suitable order than described below:

Step 1301

This step corresponds to step 403 in FIG. 4, step 506 in FIG. 5, step 605 in FIG. 6 and step 705 in FIG. 7. The SMF 108, 310 receives, from a RAMF 305, a request associated with connectivity to the DN 120 for an application 300 having a subscription ID. The request may be:

a request for establishing a connection between the application 300 and the DN 120, or request for modifying an already existing connection 130 between the application 300 and the DN 120 for, or a request for the application 300 to join an existing connection using another UE 101 and to the same DN 120.

Two or more applications 300 requesting connectivity to the same DN 120 may use the same subscription ID. The subscription ID may comprise at least an application user part and a domain part, and the application user part may be a permanent application user ID or the temporary ID. The temporary ID may be received in the request or it may be assigned by a SMF 108, 310.

The application 300 may be incorporated in the UE 101, or the application 300 may be a standalone unit which is separate from the UE 101 and which is arranged to communicate with the UE 101.

Step 1303

This step corresponds to step 507 in FIG. 5b. The SMF 108, 310 may obtain subscription data associated with the subscription ID.

Step 1304

This step corresponds to step 508 in FIG. 5b. The SMF 108, 310 may be an I-SMF 310.

The SMF 108, 310 may determine that the request is intended for another SMF 108 for the same DN 120.

Step 1305

This step corresponds to step 508 in FIG. 5b. This step may be performed after step 1304. The SMF 108, 310 may redirect the request to the other SMF 108 to which the request is intended.

Step 1305a

This step may be seen as a substep of step 1305. The step corresponds to step 508 in FIG. 5b and step 707 in FIG. 7. The SMF 108, 310 may forward the request to the other SMF 108.

Step 1305b

This step may be seen as a substep of step 1305. The step may be performed instead of step 1305a, i.e. it is an alternative to step 1305a. The SMF 108, 310 may transmit instructions to the RAMF 305 to forward the request to the other SMF 108.

Step 1306

This step corresponds to step 406 in FIG. 4, step 509 in FIG. 5b, step 606 in FIG. 6 and step 708 in FIG. 7. The SMF 108, 310 determines whether the request is accepted. The decision of whether the request has been accepted may be based on the subscription data.

Step 1307

This step corresponds to step 406 in FIG. 4, step 509 in FIG. 5b, step 606 in FIG. 6 and step 708 in FIG. 7. The SMF 108, 310 transmits, to the RAMF 3005, at least one of the following: accept information indicating whether the request is accepted, the temporary ID, a SMF ID and a connection ID.

The connection ID may be a dedicated identity for the application's 300 connection to the DN 120. The application 300 may have an already existing connection to the DN 120 routed via the UE 101. The existing connection 130 may be identified with a connection ID.

Figure 14:
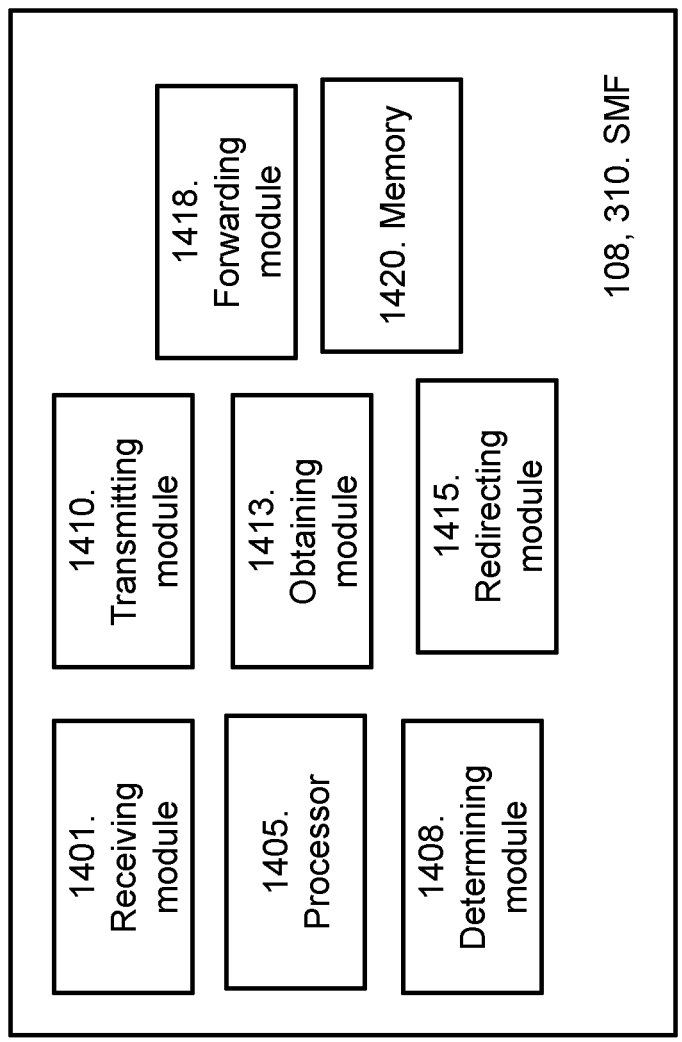
FIG. 14 is a schematic block diagram illustrating an embodiment of a SMF.

To perform the method steps shown in FIGS. 4-7 and 13 for handling connectivity to the DN 120, the SMF 108, 310 may comprise an arrangement as shown in FIG. 14.

The SMF 108, 310 is adapted to, e.g. by means of a receiving module 1401, receive, from a RAMF 305, a request associated with connectivity to the DN 120 for an application 300 having a subscription ID. The receiving module 1401 may also be referred to as a receiving unit, a receiving means, a receiving circuit, means for receiving, input unit etc. The receiving module 1401 may be a receiver, a transceiver etc. The receiving module 1401 may be a wireless receiver of the SMF 108, 310 of a wireless or fixed communications system. The request may be:

a request for establishing a connection 130 between the application 300 and the DN 120, or a request for modifying an already existing connection 130 between the application 300 and the DN 120, or a request for the application 300 to join an existing connection using another UE 101 and to the same DN 120.

Two or more applications 300 requesting connectivity to the same DN 120 may use the same subscription ID. The subscription ID may comprise at least an application user part and a domain part, and the application user part may be a permanent application user ID or the temporary ID assigned by the SMF 108, 310 or received in the request.

The application 300 may have an already existing connection to the DN 120 routed via the UE 101, and the existing connection 130 may be identified with a connection ID. The application 300 may be incorporated in the UE 101, or the application 300 may be a standalone unit which is separate from the UE 101 and which is arranged to communicate with the UE 101.

The SMF 108, 310 is adapted to, e.g. by means of a determining module 1408, determine whether the request is accepted. The determining module 1408 may also be referred to as a determining unit, a determining means, a determining circuit, means for determining etc. The determining module 1408 may be a processor 1405 of the SMF 108, 310. The decision of whether the request has been accepted may be based on the subscription data.

The SMF 108, 310 is adapted to, e.g. by means of a transmitting module 1410, transmit, to the RAMF 305, at least one of: accept information indicating whether the request is accepted, the temporary ID, a SMF ID and a connection ID. The connection ID may be a dedicated identity for the application's 300 connection to the DN 120. The transmitting module 1410 may also be referred to as a transmitting unit, a transmitting means, a transmitting circuit, means for transmitting, output unit etc. The transmitting module 1410 may be a transmitter, a transceiver etc. The transmitting module 1410 may be a wireless transmitter of the SMF 108, 310 of a wireless or fixed communications system.

The SMF 108, 310 may be further adapted to, e.g. by means of an obtaining module 1413, obtain subscription data associated with the subscription ID. The obtaining module 1413 may also be referred to as an obtaining unit, an obtaining means, an obtaining circuit, means for obtaining etc. The obtaining module 1413 may be the processor 1405 of the SMF 108, 310.

The SMF 108, 310 may be an I-SMF 310, and the I-SMF 310 may be further adapted to, e.g. by means of the determining module 1408, determine that the request is intended for another SMF 108 for the same DN 120.

The SMF 108, 310 may be further adapted to, e.g. by means of a redirecting module 1415, redirect the request to the other SMF 108 to which the request is intended. The redirecting module 1415 may also be referred to as a redirecting unit, a redirecting means, a redirecting circuit, means for redirecting etc. The redirecting module 1415 may be the processor 1405 of the SMF 108, 310.

The SMF 108, 310 may be further adapted to, e.g. by means of a forwarding module 1418, forward the request to the other SMF 108. The forwarding module 1418 may also be referred to as a forwarding unit, a forwarding means, a forwarding circuit, means for forwarding etc. The forwarding module 1418 may be the processor 1405 of the SMF 108, 310. The forwarding module 1418 may be the same as the transmitting module 1410. The SMF 108, 310 may be further adapted to, e.g. by means of the transmitting module 1410, transmit instructions to the RAMF 305 to forward the request to the other SMF 108.

In some embodiments, SMF 108, 310 comprises a memory 1420. The memory 1420 comprises instructions executable by the processor 1405. The memory 1420 comprises one or more memory units. The memory 1420 is arranged to be used to store data, received data streams, power level measurements, requests, subscription ID, connection ID, accept information, temporary ID, SMF ID, threshold values, time periods, configurations, schedulings, and applications to perform the methods herein when being executed in the SMF 108, 310.

In some embodiments, a second computer program may comprise instructions which, when executed on at least one processor (e.g. processor 1405), cause the at least one processor to carry out at least some of the method steps in FIGS. 4-7 and 13. A second carrier may comprise the second computer program, and the second carrier is one of an electronic signal, optical signal, radio signal or computer readable storage medium.

Those skilled in the art will also appreciate that the receiving module 1401, the determining module 1408, the transmitting module 1410, the obtaining module 1413, the redirecting module 1415 and the forwarding module 1418 described above may refer to a combination of analog and digital circuits, and/or one or more processors configured with software and/or firmware, e.g. stored in a memory (e.g. memory 1420), that when executed by the one or more processors such as the processor 1405 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The method described above will now be described seen from the perspective of the UE 101. The present method in the UE 101 for handling connectivity to a DN 120 comprises at least one of the following steps to be performed by the UE 101, which steps may be performed in any suitable order than described below:

Step 1501

The UE 101 receives, from the application 300, a request associated with connectivity to the DN 120 for the application 300 having a subscription ID. Thus, the request may comprise the subscription ID. In some embodiments, the request may also comprise a connection ID.

The request may be one of the following:
- a request for establishing a connection 130 between the application 300 and the DN 120, or
- a request for modifying (see FIG. 6) an already existing connection 130 between the application 300 and the DN 120, or
- a request for the application 300 to join (see FIG. 7) an existing connection using another UE 101 and to the same DN 120.

Two or more application's 300 requesting connectivity to the same DN 120 may have the same subscription ID.

The subscription ID may comprise at least an application user part and a domain part, and the application user part may be a permanent application user ID or a temporary ID generated by the SMF 108, 310.

The application 300 may have an already existing connection to the DN 120 routed via the UE 101, and the existing connection 130 may be identified with a connection ID.

The application 300 may be incorporated in the UE 101, or the application 300 may be a standalone unit which is separate from the UE 101 and which is arranged to communicate with the UE 101.

The subscription ID for the application 300 may be the same as the identity for the UE 101 authentication with the RAMF 105.

The request may be received using a mobility management signaling path (i.e. a path between the UE 101 and the RAMF 305).

Step 1502

The UE 101 forwards the request to the RAMF 305 via a RAN 103. 28. The request may be forwarded using a mobility management signaling path.

Step 1503

The UE 101 may receive at least one of: information indicating accept of the request, a temporary ID for at least a part of the subscription ID and a connection ID from the RAMF 305. The connection may be is a dedicated identity for the application's connection 130 to the DN 120.

Step 1504

The UE 101 may forward at least one of the following parameters to the application 300: the accept information, the temporary ID and the connection ID.

The present mechanism for handling connectivity to a DN 120 may be implemented through one or more processors, such as a processor 1205 in the RAMF 305 arrangement depicted in FIG. 12 and a processor 1405 in the SMF 108, 310 arrangement depicted in FIG. 14, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the RAMF 305 and/or the SMF 108, 310. One such carrier may be in the form of a CD ROM disc. It is however feasible with other data carriers such as a memory stick. The computer program code can furthermore be provided as pure program code on a server and downloaded to the RAMF 305 and/or the SMF 108, 310.

Some example embodiments may be summarized as follows:

There may be a separation of the identities for RAN access/mobility (e.g. traditional IMSI) versus identities for connectivity. The UE 101 and RAMF 305 may be enabled to route "SM NAS" signaling for connectivity between the application 300 and the SMF 108, 310.

With the embodiments herein, the "SM NAS signaling" is allowed to use application 300 to SMF 108, 310 encryption, but requires the signaling to have protected (e.g. signed) information that allows the RAMF 305 to route the "SM NAS" messages as appropriate.

The SM level identities are arranged to have a domain part and one part per application 300. The domain part may be a globally known domain. The, per domain, user part may be a private identity within that domain. The identity shall be sufficient for the domain to decode to a unique application 300 or set thereof. The use of a temporary identity may help maintaining the domain integrity, but is not mandatory.

The application 300 and the UE 101 can use different or the same identities (i.e. subscription ID), and there can be different applications 300 using the same subscription ID. E.g. the john. doe@gmail.com has an array of applications 300 that use the same subscription ID. This possibility need to be preserved. Also, the same subscription ID (using the same subscription ID) may appear on several "small" devices for the same application 300—if for instance referring to an example with to SVTplay as a candidate to be an application 300 in the sense meant here).

The communication system in which the embodiments herein are implemented may be described as being divided into the following parts:

Radio network (RAN) where the RANF may be included, and

Domains with:
  Subscription ID for the connectivity.
  I-SMF 310 adapted to find a SMF 108.
    The domains may optionally be divided into slices, where each slice can be seen as its own core network with a respective SMF 108 and other functions for providing connectivity.

The application 300 may be a software (e.g. "app") in the UE 101 itself, or a software in a separate hardware. There may be more than one application 300 served by the same UE 101. The same identity can be used by several applications 300, but just one for a specific UE 101.

The application 300 may be described as an entity which:
Is either integrated in the UE 101 or is separate from the UE 101.
Uses a subscription ID which is used by the application 300 for authentication (the user part can be encrypted if a temporary ID exists)
The subscription ID indicates the domain which the application 300 belongs to (<domain>). The domain part of the ID does not have to be encrypted.
Is assigned a temporary ID at first use. The temporary ID can be used as the user part of the subscription ID instead of the actual user part when the temporary ID is assigned by the network. The domain (e.g. the SMF 108, 310) is expected to find the subscription data based on the temporary ID.
When the temporary ID exists, the UE encrypts the actual ID as a part of the actual message's body.
The domain, i.e. the (I-)SMF 108, 310 generates a connection ID (unique within the domain) for each accepted connection. The connection ID is sent to the application 300 to be used in e.g. a join method (see FIG. 6).

If the RAMF 305 has the SMF address, then the I-SMF 310 may be by-passed. The UE subscription is a prerequisite for the UE 101 to use the radio. The application 300 has its "connectivity ID" in the subscription in the domain of that ID.

The subscription ID may have different formats depending on the situation. One format is the actual identity which is used if it is not possible to encrypt the information. Another format is the temporary ID which is changeable and which is an identity that should be used if possible. The temporary ID may be registered in a subscription node, and also the association between the connection ID and the SMF 108, 310 which handles this connection is stored in the subscription node.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a Radio Access Management Function, RAMF, for handling connectivity to a Data Network, DN, the method comprising:
   receiving, from a User Equipment, UE, a request associated with connectivity to the DN for an application having a subscription ID, wherein the request comprises the subscription ID, and wherein the application is co-located or incorporated into the UE or located in a separate device;
   selecting, based on at least a part of the subscription ID, which Session Management Function, SMF, the request should be forwarded to;
   forwarding the request to the selected SMF;
   receiving, from the SMF, accept information indicating whether the request is accepted, a temporary ID for at least a part of the subscription ID, a SMF ID and a connection ID; and
   transmitting at least one of the accept information, the temporary ID and the connection ID to the UE.

2. The method according to claim 1, wherein the request is:
   a request for establishing a connection between the application and the DN, or
   a request for modifying an already existing connection between the application and the DN, or
   a request for the application to join an existing connection using another UE and to the same DN.

3. The method of claim 1, wherein the connection ID is a dedicated identity for the application's connection to the DN.

4. The method of claim 1, wherein two or more applications requesting connectivity to the same DN use the same subscription ID.

5. The method of claim 1, wherein the subscription ID comprises at least an application user part and a domain part, and
wherein the application user part is a permanent application user ID or a temporary ID assigned by the SMF.

6. The method of the claim 1, wherein the selecting which SMF the request should be forwarded to further comprises:
selecting the SMF based on a domain part of the subscription ID and a connection ID, or
selecting the SMF based on a domain part and a temporary ID of the subscription ID, or
selecting the SMF based on a domain part of the subscription ID.

7. The method of claim 1, further comprising:
receiving instructions from an I-SMF to redirect the request to another SMF; and
forwarding the request to the other SMF.

8. A computer program product comprising a non-transitory computer readable storage medium storing instructions which, when executed on at least one processor, cause the at least one processor to carry out the method according to claim 1.

9. A method performed by a Session Management Function, SMF, for handling connectivity to a Data Network, DN, the method comprising:
receiving, from a Radio Access Management Function, RAMF, a forwarded request, from a User Equipment, UE, associated with connectivity to the DN for an application having a subscription ID, wherein the request comprises the subscription ID, and wherein the application is co-located or incorporated into the UE or located in a separate device;
determining whether the request is accepted; and
transmitting, to the RAMF, accept information indicating whether the request is accepted, a temporary ID for at least a part of the subscription ID, a SMF ID and a connection ID.

10. The method according to claim 9, wherein the temporary ID is received in the request or assigned by the SMF.

11. The method of claim 9, wherein the request is:
a request for establishing a connection between the application and the DN, or
a request for modifying an already existing connection between the application and the DN for, or
a request for the application to join an existing connection using another UE and to the same DN.

12. The method of claim 9, further comprising:
obtaining subscription data associated with the subscription ID; and wherein the decision of whether the request has been accepted is based on the subscription data.

13. The method of claim 9, wherein the SMF is an Interrogating-SMF, I-SMF, and wherein the method further comprises:
determining that the request is intended for another SMF for the same DN; and
redirecting the request to the other SMF to which the request is intended.

14. The method according to claim 13, wherein the redirecting further comprises:
forwarding the request to the other SMF; or
transmitting instructions to the RAMF to forward the request to the other SMF.

15. A computer program product comprising a non-transitory computer readable storage medium storing instructions which, when executed on at least one processor, cause the at least one processor to carry out the method according to claim 9.

16. A Radio Access Management Function, RAMF, for handling connectivity to a Data Network, DN, the RAMF being adapted to:
receive, from a User Equipment, UE, a request associated with connectivity to the DN for an application having a subscription ID, wherein the request comprises the subscription ID, and wherein the application is co-located or incorporated into the UE or located in a separate device;
select, based on at least a part of the subscription ID, which Session Management Function, SMF, the request should be forwarded to;
forward the request to the selected SMF;
receive, from the SMF, accept information indicating whether the request is accepted, a temporary ID for at least a part of the subscription ID, a SMF ID and a connection ID; and to
transmit at least one of the accept information, the temporary ID and the connection ID to the UE.

17. The RAMF according to claim 16,
wherein the application user part is a permanent application user ID or a temporary ID assigned by the SMF.

18. The RAMF according to claim 16, wherein RAMF is adapted to select which SMF the request should be forwarded, based on:
selecting the SMF based on a domain part of the subscription ID and a connection ID, or
selecting the SMF based on a domain part and a temporary ID of the subscription ID, or
selecting the SMF based on a domain part of the subscription ID.

19. A Session Management Function, SMF, for handling connectivity to a Data Network, DN, the SMF being adapted to:
receive, from a Radio Access Management Function, RAMF, a forwarded request, from a User Equipment, UE, associated with connectivity to the DN for an application having a subscription ID, wherein the request comprises the subscription ID, and wherein the application is co-located or incorporated into the UE or located in a separate device;
determine whether the request is accepted; and to
transmit, to the RAMF, accept information indicating whether the request is accepted, a temporary ID, a SMF ID and a connection ID.

20. The SMF according to claim 19, wherein the request is:
a request for establishing a connection between the application and the DN, or
a request for modifying an already existing connection between the application and the DN for, or
a request for the application to join an existing connection using another UE and to the same DN.

* * * * *